United States Patent
Lee et al.

(10) Patent No.: US 7,920,370 B2
(45) Date of Patent: Apr. 5, 2011

(54) MULTILAYER CHIP CAPACITOR

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 331 days.

(21) Appl. No.: 11/987,835

(22) Filed: Dec. 5, 2007

(65) Prior Publication Data

US 2008/0186652 A1 Aug. 7, 2008

(30) Foreign Application Priority Data

Feb. 5, 2007 (KR) .................. 10-2007-0011460
Aug. 21, 2007 (KR) .................. 10-2007-0084183

(51) Int. Cl.
  *H01G 4/228* (2006.01)
  *H01G 4/248* (2006.01)
  *H01G 4/06* (2006.01)
(52) U.S. Cl. ............... 361/306.3; 361/310; 361/321.2
(58) Field of Classification Search ............ 361/306.3, 361/306.2, 309, 308.1, 321.3, 321.2, 306.1, 361/312, 302, 303, 301.4, 310, 321.1, 313
See application file for complete search history.

(56) References Cited

U.S. PATENT DOCUMENTS

| | | | | |
|---|---|---|---|---|
| 4,590,537 A | * | 5/1986 | Sakamoto | ............ 361/306.3 |
| 5,880,925 A | | 3/1999 | DuPre et al. | |
| 6,433,995 B2 | * | 8/2002 | Nakagawa et al. | ......... 361/311 |
| 6,768,630 B2 | * | 7/2004 | Togashi | ............ 361/306.1 |
| 7,230,815 B2 | | 6/2007 | Yoon et al. | |
| 2004/0223290 A1 | * | 11/2004 | Sutardja | ............ 361/306.3 |
| 2005/0030510 A1 | * | 2/2005 | Tsuji | ...................... 355/71 |
| 2006/0279903 A1 | * | 12/2006 | Togashi et al. | ............ 361/303 |
| 2008/0253059 A1 | * | 10/2008 | Eggerding et al. | ...... 361/301.4 |

FOREIGN PATENT DOCUMENTS

JP  55-43869  3/1980

(Continued)

OTHER PUBLICATIONS

Japanese Office Action, with English Translation, issued in Japanese Patent Application No. 2007-322638, dated Jan. 5, 2010.

(Continued)

*Primary Examiner* — Eric Thomas
*Assistant Examiner* — David M Sinclair
(74) *Attorney, Agent, or Firm* — McDermott Will & Emery LLP

(57) ABSTRACT

A multilayer chip capacitor includes: a capacitor body having first and second side surfaces and a bottom surface; a plurality of first and second internal electrodes in the capacitor body; first and second external electrodes having a first polarity and formed on the first and second side surfaces, respectively, to cover a respective lower edge of the side surfaces and to partially extend to the bottom surface; and a third external electrode having a second polarity and formed on the bottom surface. The internal electrodes are disposed in perpendicular to the bottom surface. Each of the first internal electrodes has a first lead drawn to the first side and bottom surfaces and a second lead drawn to the second side and bottom surfaces. Each of the second internal electrodes has a third lead drawn to the bottom surface.

8 Claims, 20 Drawing Sheets

FOREIGN PATENT DOCUMENTS

| | | | |
|---|---|---|---|
| JP | 02159710 A | * | 6/1990 |
| JP | 06-053075 | | 2/1994 |
| JP | 06033075 A | * | 2/1994 |
| JP | 06251981 A | * | 9/1994 |
| JP | 06325977 A | * | 11/1994 |
| JP | 2001155952 A | * | 6/2001 |
| JP | 2004-140183 | | 5/2004 |
| JP | 2004-296940 | | 10/2004 |
| JP | 2006-013379 | | 1/2006 |
| JP | 2006-100682 | | 4/2006 |
| KR | 10-2006-0073274 | | 6/2006 |

OTHER PUBLICATIONS

United States Office Action issued in U.S. Appl. No. 12/817,046 dated Oct. 8, 2010.

* cited by examiner

MULTILAYER CHIP CAPACITOR

CROSS-REFERENCE TO RELATED APPLICATIONS

This application claims the priority of Korean Patent Application Nos. 2007-11460 filed on Feb. 5, 2007 and 2007-84183 filed on Aug. 21, 2007, in the Korean Intellectual Property Office, the disclosures of which are incorporated herein by reference.

BACKGROUND OF THE INVENTION

1. Field of the Invention

The present invention relates to a multilayer chip capacitor, and more particularly, to a multilayer chip capacitor having a reduced equivalent series inductance (ESL).

2. Description of the Related Art

A multilayer chip capacitor is used as a useful decoupling capacitor of a high frequency circuit such as a power supply circuit of a LSI. In order to stabilize the power supply circuit, the multilayer chip capacitor is required to have a low equivalent series inductance (ESL). This requirement is further increased as electronic devices tend to be operated in a high frequency and a high current. The stability of the power supply circuit greatly depends on the ESL of the multilayer chip capacitor. In particular, a high stability can be obtained in a low ESL.

In addition, the multilayer chip capacitor is also used as an electro-magnetic interference (EMI) filter. In this case, a low ESL is preferable for a noise removal effect in a high frequency band and a good attenuation characteristic.

U.S. Pat. No. 5,880,925 discloses a technology of reducing the ESL by using an interdigitated arrangement where leads of first and second internal electrodes having opposite polarities are interdigitated. FIG. 1A is a perspective view illustrating an exterior of a conventional multilayer chip capacitor, and FIG. 1B is a cross-sectional view taken along line A-A' of FIG. 1A. FIG. 2 is a perspective exploded view illustrating the internal electrode structure of the multilayer chip capacitor of FIG. 1.

Referring to FIGS. 1A through 2, the multilayer chip capacitor 10 comprises a capacitor body 11. First and second internal electrodes 14 and 15 having opposite polarities are disposed on dielectric layers 11a and 11b in the capacitor body 11, respectively. The first and second internal electrodes 14 and 15 are connected to external electrodes 12 and 13 through leads 16 and 17, respectively. The leads 16 of the first internal electrodes 14 and the leads 17 of the second internal electrodes 15 are disposed to be adjacent to each other in an interdigitated arrangement. Since polarities of voltages supplied to the adjacent leads are different, magnetic fluxes generated from high frequency currents applied from the external electrodes are cancelled between the adjacent leads, so that the ESL can be reduced.

However, in order to implement more stabilized power supply circuit of the decoupling capacitor and to more effectively remove the high frequency noise in the EMI filter, it is necessary to further reduce the ESL of the multilayer chip capacitor.

SUMMARY OF THE INVENTION

An aspect of the present invention provides a multilayer chip capacitor having a more reduced ESL (equivalent series inductance).

According to a first aspect of the present invention, there is provided a multilayer chip capacitor comprising: a capacitor body formed by laminating a plurality of dielectric layers and having first and second side surfaces facing each other, a top surface and a bottom surface; a plurality of first and second internal electrodes alternately disposed in the capacitor body with each of the dielectric layers interposed therebetween; a first external electrode of a first polarity formed on the first side surface to cover a lower edge of the first side surface and to partially extend to the bottom surface; a second external electrode of the first polarity formed on the second side surface to cover a lower edge of the second side surface and to partially extend to the bottom surface; and a third external electrode of a second polarity formed on the bottom surface between the first and second external electrodes. The first and second internal electrodes are disposed in perpendicular to the bottom surface of the capacitor body. Each of the first internal electrodes has a first lead drawn to the first side surface and the bottom surface and a second lead drawn to the second side surface and the bottom surface, and each of the second internal electrodes has a third lead drawn to the bottom surface between the first and second leads. The first to third leads are in contact with the first to third external electrodes through the entire length of the edge portions of the respective leads exposed to outer surfaces of the capacitor body to be connected to the first to third external electrodes, respectively.

In an embodiment of the first aspect of the present invention, the first external electrode may be formed to cover upper and lower edges of the first side surface of the capacitor body and to partially extend to the top surface and the bottom surface of the capacitor body, and the second external electrode may be formed to cover upper and lower edges of the second side surface of the capacitor body and to partially extend to the top surface and the bottom surface of the capacitor body.

In an embodiment, a width of a portion of the first lead drawn to the bottom surface of the capacitor body may be equal to a width of a portion of the second lead drawn to the bottom surface of the capacitor body. In this case, a width of the third lead may be larger than the width of the portion of the first lead drawn to the bottom surface.

In an embodiment, a lamination direction length of the capacitor body may be smaller than a distance between the first side surface and the second side surface. In this case, a width of a portion of the first lead drawn to the bottom surface of the capacitor body may be equal to a width of a portion of the second lead drawn to the bottom surface of the capacitor body, and a width ratio of a width of the third lead to the width of the portion of the first lead drawn to the bottom surface may be 1.38 or more.

In an embodiment, a lamination direction length of the capacitor body may be larger than a distance between the first side surface and the second side surface. In this case, a width of a portion of the first lead drawn to the bottom surface of the capacitor body may be equal to a width of a portion of the second lead drawn to the bottom surface of the capacitor body. Particularly, a width ratio of a width of the third lead to the width of the portion of the first lead drawn to the bottom surface may be 2 or more.

In an embodiment, the multilayer chip capacitor may further comprise a fourth external electrode of the second polarity formed on the top surface of the capacitor body between the first external electrode and second external electrode. The first lead may be formed to be drawn to the first side surface, the bottom surface and the top surface, and the second lead may be formed to be drawn to the second side surface, the bottom surface and the top surface. The first external electrode may be formed to cover upper and lower edges of the first side surface and to partially extend to the top surface and the bottom surface, and the second external electrode may be formed to cover upper and lower edges of the second side surface and to partially extend to the top surface and the bottom surface. Each of the second internal electrodes may further include a fourth lead formed between the first and second leads to be drawn to the top surface and to be connected to the fourth external electrode. The fourth lead is in contact with the fourth external electrode through the entire edge portion of the fourth lead exposed to the bottom surface to be connected to the fourth external electrode. In this case, internal and external structures of the multilayer chip capacitor may have up-down symmetry.

According to a second aspect of the present invention, there is provided a multilayer chip capacitor comprising: a capacitor body formed by laminating a plurality of dielectric layers and having a bottom surface to be mounted on a circuit board; a plurality of internal electrodes disposed in perpendicular to the bottom surface in the capacitor body with each of the dielectric layers interposed therebetween; a first external electrode of a first polarity formed on a first side surface of the capacitor body to partially extend to the bottom surface; a second external electrode of the first polarity formed on a second side surface opposite to the first side surface to partially extend to the bottom surface; and a third external electrode of a second polarity formed on the bottom surface between the first and second external electrodes, wherein a width of the third external electrode is larger than a width of a portion of the first external electrode extending to the bottom surface and a width of a portion of the second external electrode extending to the bottom surface.

In an embodiment of the first aspect of the present invention, the first and second external electrodes may be formed symmetrically in a mirror-like shape, and the widths of the first and second external electrodes extending to the bottom surface may be equal to each other.

According to a third aspect of the present invention, there is provided a multilayer chip capacitor comprising: a capacitor body formed by laminating a plurality of dielectric layers and having a bottom surface to be mounted on a circuit board and first and second side surfaces facing each other; a plurality of first-polarity and second-polarity internal electrodes alternately disposed to face each other in the capacitor body with each of the dielectric layers interposed therebetween and disposed in perpendicular to the bottom surface of the capacitor body; first and second external electrodes formed on the first and second side surfaces, respectively, to partially extend to the bottom surface and to be electrically connected to the first-polarity internal electrodes; and a third external electrode formed on the bottom surface between the first and second external electrodes to be connected to the second-polarity internal electrodes, wherein two current loops are generated by currents flowing from the first and second external electrodes to the third external electrode.

In an embodiment of the third aspect of the present invention, the first-polarity internal electrodes may have first internal electrode patterns connected to both the first and second external electrodes. The second-polarity internal electrodes may have second internal electrode patterns connected to the third external electrode.

In an embodiment, the first-polarity internal electrodes may have first internal electrode patterns connected to only the first external electrode and second internal electrode patterns connected to only the second external electrode, wherein the first and second internal electrode patterns may be alternately disposed in a lamination direction. The second-polarity internal electrodes may have third internal electrode patterns connected to only the third external electrode.

In an embodiment, the multilayer chip capacitor may further comprise a fourth external electrode of a second polarity formed on the top surface of the capacitor body between the first external electrode and the second external electrode.

In an embodiment, each of the first-polarity internal electrodes may be formed to have an "H"-shaped electrode pattern to be connected to the first and second external electrodes, and each of the second-polarity internal electrodes may be formed to have a "+"-shaped electrode pattern to be connected to the third and fourth external electrodes.

In an embodiment, the first-polarity internal electrodes may be formed by alternately and repeatedly disposing two "T"-shaped electrode patterns in opposite directions to be alternately connected to the first external electrode and the second external electrode, and each of the second-polarity internal electrodes may be formed to have a "+"-shaped electrode pattern.

According to a fourth aspect of the present invention, there is provided a multilayer chip capacitor comprising: a capacitor body formed by laminating a plurality of dielectric layers and having a bottom surface to be mounted on a circuit board and first and second side surfaces facing each other; a plurality of first-polarity and second-polarity internal electrodes alternately disposed to face each other in the capacitor body with each of the dielectric layers interposed therebetween, the first-polarity and second-polarity internal electrodes being disposed in perpendicular to the bottom surface of the capacitor body; first and second external electrodes formed on the first and second side surfaces to extend to the bottom surface and to be electrically connected to the first-polarity internal electrodes; and a third external electrode formed on the bottom surface between the first and second external electrodes to be connected to the second-polarity internal electrodes, wherein each of the first-polarity internal electrodes has a first-polarity main portion and a first-polarity lead drawn from the first-polarity main portion to the bottom surface and one side surface to be connected to one of the first and second external electrodes, wherein each of the second-polarity internal electrodes has a second-polarity main portion and a second-polarity lead drawn from the second-polarity main portion to the bottom surface to be connected to the third external electrode, wherein a distance from the first-polarity main portion to the bottom surface is equal to a distance from the second-polarity main portion to the bottom surface, and wherein ESL (equivalent series inductance) of 100 pH or less is obtained by adjusting a gap G between adjacent first-polarity lead and the second-polarity lead, a distance M from the first-polarity main portion to the bottom surface, the number N of internal electrodes in the capacitor body, and a lead width ratio $W_2/W_1$ of a width $W_2$ of the second-polarity lead to a width $W_1$ of a portion of the first-polarity drawn to the bottom surface.

In an embodiment of the fourth aspect of the present invention, each of the first-polarity internal electrodes may have two of the first-polarity leads to be connected to the first and second external electrodes, and the two first-polarity leads may be a first lead drawn to the bottom surface and the first side surface to be connected to the first external electrode and a second lead drawn to the bottom surface and the second side surface to be connected to the second external electrode.

In an embodiment, the first-polarity internal electrodes may have first internal electrode patterns connected to only the first external electrode and second internal electrode patterns connected to only the second external electrode, wherein the first and second internal electrode patterns may be alternately disposed in a lamination direction. The second-polarity internal electrodes may have third internal electrode patterns connected to only the third external electrode. Each of the first internal electrode patterns may have a first lead drawn to the bottom surface and the first side surface to be connected to the first external electrode, and each of the second internal electrode patterns may have a second lead drawn to the bottom surface and the second side surface to be connected to the second external electrode.

In an embodiment, the multilayer chip capacitor may further comprise a fourth external electrode of the second polarity formed on the top surface between the first external electrode and the second external electrode.

In an embodiment, each of the first-polarity internal electrodes may be formed to have an "H"-shaped electrode pattern to be connected to the first and second external electrodes, and each of the second-polarity internal electrodes may be formed to have a "+"-shaped electrode pattern to be connected to the third and fourth external electrodes.

In an embodiment, the first-polarity internal electrodes may be formed by alternately and repeatedly disposing two "T"-shaped electrode patterns in opposite directions to be alternately connected to the first external electrode and the second external electrode, and each of second-polarity internal electrodes may be formed to have a "+"-shaped electrode pattern to be connected to the third and fourth external electrodes.

According to a fifth aspect of the present invention, there is provided a multilayer chip capacitor comprising: a capacitor body formed by laminating a plurality of dielectric layers and having a bottom surface to be mounted on a circuit board, first and second side surfaces facing each other, and third and fourth side surfaces facing each other; a plurality of first-polarity and second-polarity internal electrodes alternately disposed to face each other in the capacitor body with each of the dielectric layers interposed therebetween, the first-polarity and second-polarity internal electrodes being disposed in parallel to the bottom surface of the capacitor body; a first external electrode formed on the first side surface to partially extend to the third and fourth side surfaces and to be electrically connected to the first-polarity internal electrodes; a second external electrode formed on the second side surface to partially extend to the third and fourth side surfaces and to be electrically connected to the first-polarity internal electrodes; and a third external electrode formed on the third and fourth side surfaces between the first and second side surfaces to be electrically connected to the second-polarity internal electrodes; wherein each of the first-polarity internal electrodes has a first-polarity lead drawn to the one of the first and second side surfaces, the third side surface, and the fourth side surface to be connected to one of the first and second external electrodes, wherein each of the second-polarity internal electrodes has two second-polarity leads drawn to the third and fourth side surfaces to be connected to the third external electrode, and wherein a width ratio of a width of the second-polarity lead to a width of a portion of the first-polarity lead drawn to the third and fourth side surface is 1.43 or more.

In an embodiment of the fifth aspect of the present invention, each of the first-polarity internal electrodes may be formed to have an "H"-shaped electrode pattern to be connected to the first and second external electrodes, and each of the second-polarity internal electrodes may be formed to have a "+"-shaped electrode pattern to be connected to the third external electrode.

In an embodiment, the first-polarity internal electrodes may be formed by alternately and repeatedly disposing two "T"-shaped electrode patterns in opposite directions to be alternately connected to the first external electrode and the second external electrode, and each of second-polarity internal electrodes may be formed to have a "+"-shaped electrode pattern to be connected to the third external electrode.

In the specification, a "bottom surface" of a capacitor body denotes a surface of the capacitor body which is to be mounted on a circuit board, and a "top surface" of the capacitor body denotes a surface opposite to the bottom surface.

According to the present invention, it is possible to further reduce ESL of a multilayer chip capacitor. Therefore, in uses of a decoupling capacitor and an EMI filter, it is possible to more effectively suppress voltage variation of power supply circuit in the decoupling capacitor and to improve a high-frequency attenuation characteristic and high-frequency noise removing characteristic of the EMI filter.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
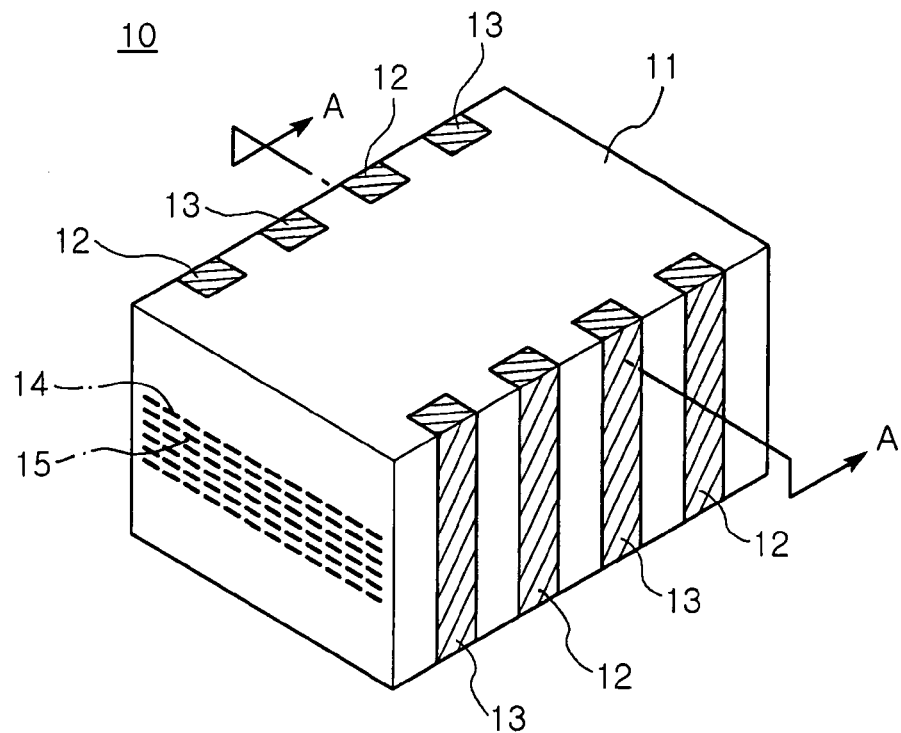
FIG. 1A is a perspective view illustrating an exterior of a conventional multilayer chip capacitor.
Figure 1B:
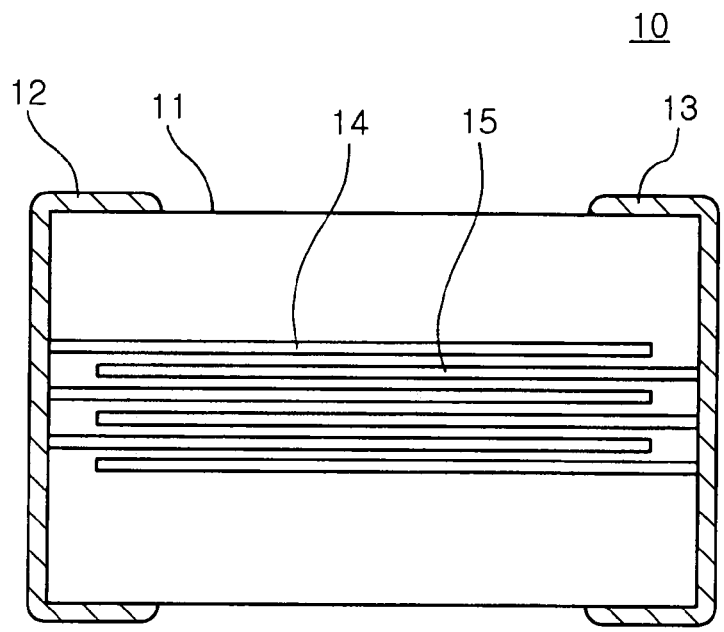
FIG. 1B is a cross-sectional view taken along line A-A' of FIG. 1A.
Figure 2:
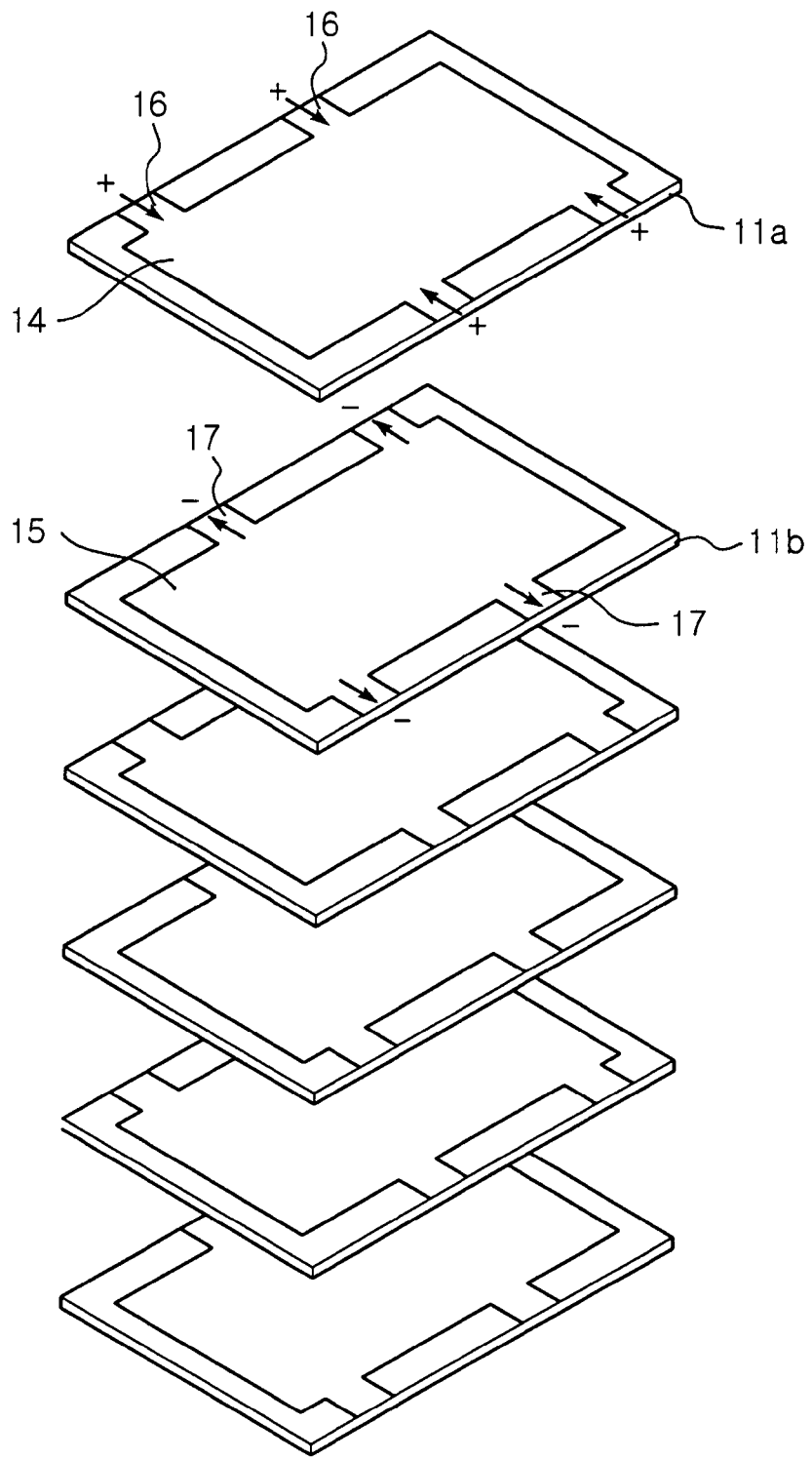
FIG. 2 is a perspective exploded view illustrating a structure of internal electrodes of the conventional multilayer chip capacitor.

Hereinafter, exemplary embodiments of the present invention will now be described in detail with reference to the accompanying drawings. The embodiments of the present invention may be modified in various forms, and the scope of the present invention is not limited to the embodiments. The embodiments of the present invention are provided in order that the ordinarily skilled in the art can have the better understanding of the present invention. In the accompanying drawings, shapes and sizes of elements may be exaggerated for clarifying of the present invention, and like reference numerals denote like elements.

Figure 3A:
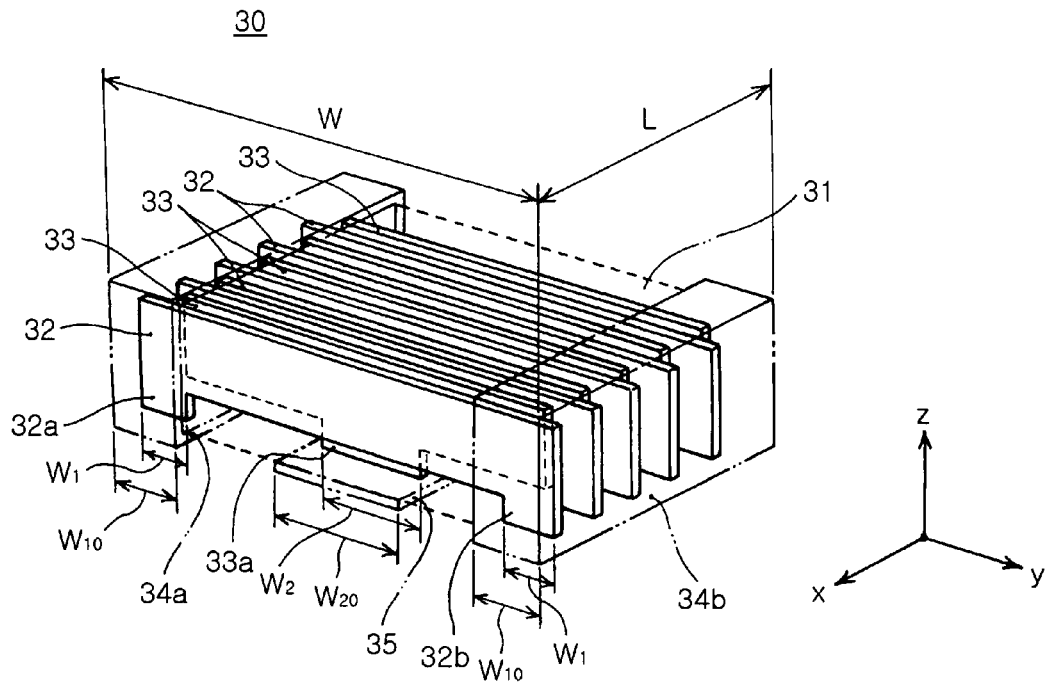
FIG. 3A is a perspective view illustrating an internal structure of a multilayer chip capacitor according to an embodiment of the present invention.
Figure 3B:
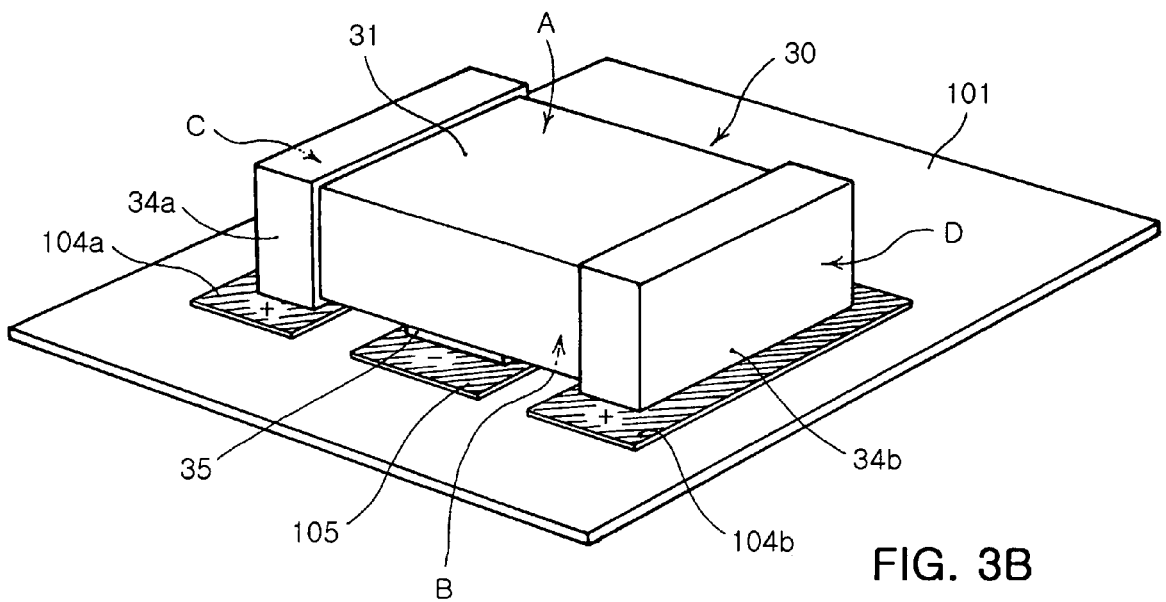
FIG. 3B is a perspective view illustrating the multilayer chip capacitor mounted on a circuit board.

FIG. 3A is a perspective view illustrating an internal structure of a multilayer chip capacitor according to an embodiment of the present invention, and FIG. 3B is a perspective view illustrating a state that the multilayer chip capacitor is mounted on a circuit board. In the embodiment, a lamination or stacking direction (x direction) length L of a capacitor body 31 is smaller than a distance W between side surfaces C and D which are parallel to the lamination direction.

Referring to FIGS. 3A and 3B, the multilayer chip capacitor 30 includes the capacitor body 31 in which a plurality of dielectric layers (31a and 31b of FIG. 4) are laminated. In the capacitor body 31, first internal electrodes 32 and second internal electrodes 33 are alternately disposed to face each other with the dielectric layers interposed therebetween. The capacitor body 31 has a shape of rectangular parallelepiped.

first and second external electrodes 34a and 34b having the same polarity are formed on first and second side surfaces C and D of the capacitor body 31, respectively. Particularly, first and second external electrodes 34a and 34b are formed to cover lower edges of the first and second side surfaces C and D and extend by a predetermined extension width $W_{10}$ to a bottom surface B. The first and second external electrodes 34a and 34b having the same polarity are electrically connected to the first internal electrode 32 through leads 32a and 32b of the first internal electrode 32. In addition, the first and second external electrodes 34a and 34b are formed to cover upper edges of the first and second side surfaces C and D and extend by a predetermined extension width on a top surface A. In the embodiment, the first and second external electrodes 34a and 34b are not necessarily formed to extend on the top surface. However, if the first and second external electrodes 34a and 34b are formed to extend on the top and bottom surfaces, a coating process for the first and second external electrodes can be easily performed. As shown in FIGS. 3A and 3B, the first and second external electrodes 34a and 34b are formed symmetrically in a mirror-like shape, and the extension widths of the first and second external electrodes 34a and 34b on the bottom surface are equal to each other. However, the extension widths of the first and second external electrodes 34a and 34b may not be equal to each other due to a variation in the coating process for the first and second external electrodes.

A third external electrode 35 having a polarity opposite to that of the first and second external electrodes 34a and 34b is formed on the bottom surface B (particularly, on a central portion of the bottom surface B) in the lamination direction to be separated from the first and second external electrodes 34a and 34b. The third external electrode 35 is electrically connected t to the second internal electrode 33 through a lead 33a of the second internal electrode 33. As shown in FIG. 3A, the second internal electrode 33 has a width $W_{20}$.

In the multilayer chip capacitor 30, the bottom surface B of the capacitor body 31 is disposed in parallel to the lamination direction (x direction), and the internal electrodes 32 and 33 are disposed in perpendicular to the circuit board 101. Here, the bottom surface B is a surface mounted on the circuit board (hereinafter, simply referred to as a mounting surface). In the multilayer chip capacitor where the internal electrodes 32 and 33 are disposed in perpendicular to a device mounting surface of the circuit board, the current can be directly flown from electrode pads 104a, 104b, 105 (see FIG. 3B) of the circuit board 101 through the thickness of the external electrodes 34a, 34b, and 35 into the internal electrodes 32 and 33 without additional current paths. Therefore, in comparison with a multilayer chip capacitor where the internal electrodes are disposed horizontally, that is, in parallel to the device mounting surface of the circuit board, the ESL can be further reduced. In addition, as the lamination number is increased, the ESL becomes lower.

Referring to FIG. 3B, the first and second external electrodes 34a and 34b are connected to positive (+) electrode pads 104a and 104b of the circuit board 101, and the third external electrode 35 is connected to a negative (−) electrode pad 105 of the circuit board 101. For example, in an application example where the multilayer chip capacitor 30 is used as a three-terminal EMI filter, the first and second external electrodes 34a and 34b are connected to input and output ports of a signal line, respectively, and the third external electrode 35 is connected to a ground, so that high-frequency noise of the signal line can be removed. In this case, the positive (+) electrode pads 104a and 104b correspond to the input and output ports, and negative (−) electrode pad 105 corresponds to the ground.

In addition, in another application example where the multilayer chip capacitor 30 is used as a decoupling capacitor, the first and second external electrodes 34a and 34b are connected to a power supply line, and third external electrode 35 are connected to a ground line, so that a power supply circuit can be stabilized. In this case, the positive (+) electrode pad 104a and 104b correspond to the power supply line, and the negative (−) electrode pad 105 corresponds to the ground.

Figure 4A:
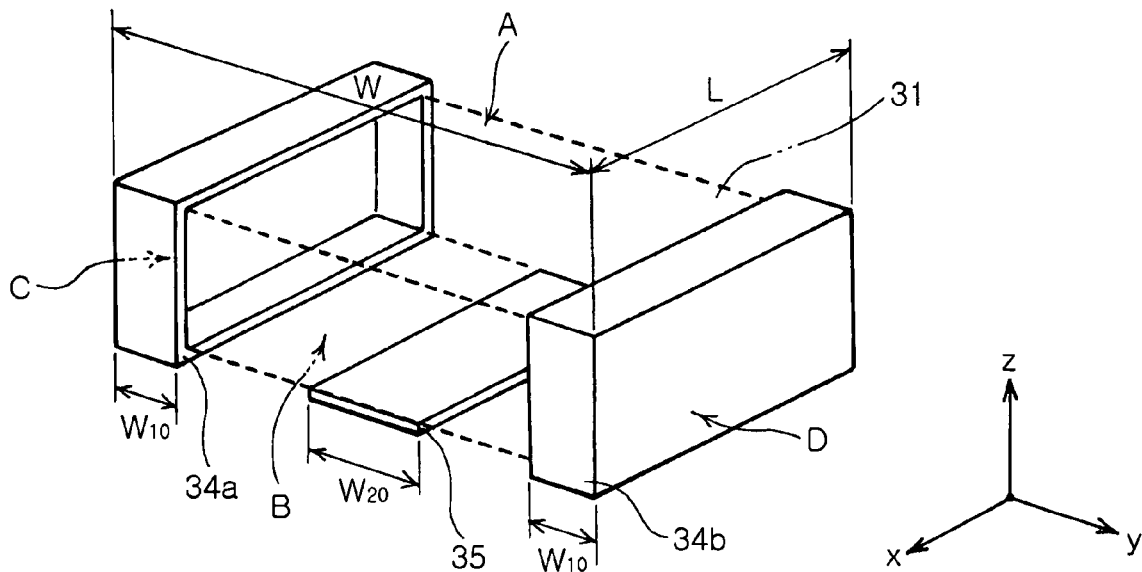
FIG. 4A is a perspective view illustrating external electrodes of the multilayer chip capacitor of FIG. 3A, and FIGS. 4B and 4C are vertical cross-sectional views illustrating a structure of internal electrodes of the capacitor.
Figure 4B:
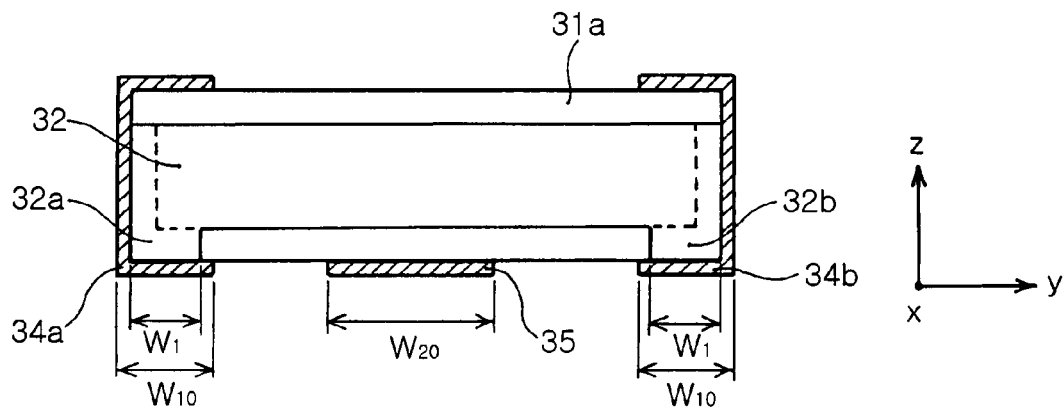
Figure 4C:
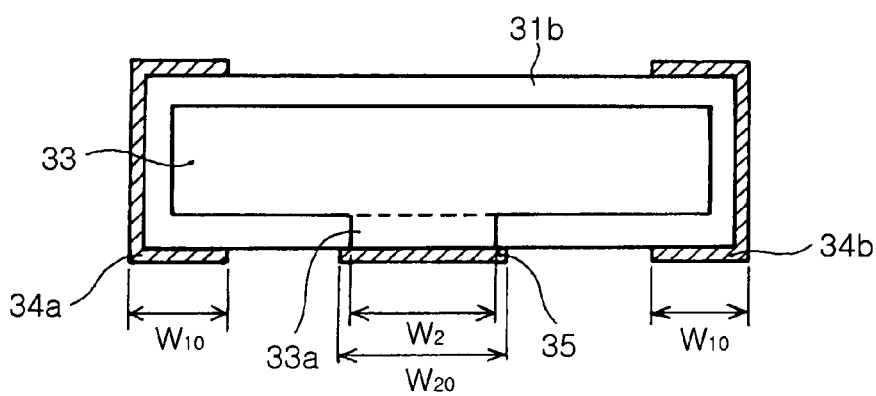

FIG. 4A is a perspective view illustrating an arrangement of the external electrodes of the multilayer chip capacitor 30 of FIG. 3A, and FIG. 4B is a cross-sectional view illustrating a structure of the first internal electrode, and FIG. 4C is a cross-sectional view illustrating a structure of the second internal electrode. The cross-sectional views of FIGS. 4B and 4C are taken along a direction perpendicular to the lamination direction (x direction).

Referring to FIG. 4, in the capacitor body 31, first internal electrodes 32 and second internal electrodes 33 are alternately disposed on the dielectric layers 31a and 31b. Each of the internal electrodes 32 and 33 has a main portion and a lead (or leads). For the convenience of description, boundaries between the main portion and the leads are denoted by dotted lines. The main portions of the internal electrodes are portions overlapped between the internal electrodes facing to each other as seen in the lamination direction, so that the main portions contribute capacitance. The leads of the internal electrodes are portions extended from the main portions, so that the leads are used for connection to the external electrodes.

The first internal electrode 32 includes a first lead 32a which is drawn to the first side surface C (left side surface in the figure) and a second lead 32b which is drawn to the second side surface D (right side surface in the figure). The first lead 32a is drawn to the bottom surface B as well as the first side surface C. Therefore, the first lead 32a is formed to extend with a width wider than the short-side width (z-direction width) of the main portion of the first internal electrode 32. Similarly, the second lead 32b is drawn to the bottom surface B as well as the second side surface D to have a wide width. Edges of the leads 32a and 32b exposed on the external surface of the capacitor body 31 are formed to continuously extend from the side surfaces C and D through the edges thereof to the bottom surface, respectively. The second internal electrode 33 includes a third lead 33a which is drawn to the bottom surface B. More specifically, the third lead 33a is drawn to the central portion of the bottom surface B between the first lead 32a and the second lead 32b as seen in the lamination direction to be connected to the third external electrode (see FIG. 4C).

As shown in FIGS. 4B and 4C, the first lead 32a of the first internal electrode 32 is in contact with the first external electrode 34a through the entire length of the edge portion of the first lead 32a exposed to the first side surface C and the bottom surface B to be connected to the first external electrode 34a. The second lead 32b of the first internal electrode 32 is in contact with the second external electrode 34b through the entire length of the edge portion of the second lead 32b exposed to the second side surface B and the bottom surface B to be connected to the second external electrode 34b. Since the first internal electrode 32 is connected to the first and second external electrodes 34a and 34b, the first internal electrode 32 and the first and second external 34a and 34b electrodes have the same polarity.

The third lead 33a of the second internal electrode 33 is in contact with the third external electrode 35 through the entire length of the edge portion of the third lead 33a exposed to an external surface (the bottom surface B) of the capacitor body 31 to be connected to the third external electrode 35. Therefore, as shown in FIGS. 4B and 4C, the y-direction extension widths $W_{10}$ and $W_{20}$ of the external electrodes 34a, 34b and 35 are formed to be equal to or larger than the y-direction widths $W_1$ and $W_2$ of the leads 32a, 32b, 33a. As seen from the cut plane perpendicular to the lamination direction (x-direction), the lengths of the external electrodes 34a, 34b, and 35 are equal to or larger than the lengths of the exposed edge portions of the leads 32a, 32b, and 33a, respectively. Since the second internal electrode 33 is connected to the third external electrode 35 through the third lead 33a, the second internal electrode 33 and the third external electrode 35 has the polarity opposite to the that of the first internal electrode 32.

Since the third lead 33a of one polarity is interposed between the first and second leads 32a and 32b of the other polarity, magnetic fluxes generated from adjacent current paths are cancelled to each other, and thus, parasitic inductance is reduced. In addition, since the first and second leads 32a and 32b are in contact with the first and second external electrodes 34a and 34b, respectively, over the side surfaces C and D and the bottom surface B, the contact areas between the internal and external electrodes can be maximized, and the current paths in the first and second leads 32a and 32b have wide widths. Due to the wide widths of the current paths, the parasitic inductance is reduced, so that the ESL of the multilayer chip capacitor 30 can be further reduced.

As seen in FIGS. 4A through 4C, the multilayer chip capacitor 30 has left-right symmetry in the internal and external structures thereof. Particularly, the width $W_1$ of the portion of the first lead 32a exposed to the bottom surface B is equal to the width $W_1$ of the portion of the second lead 32b exposed to the bottom surface B. In this case, the width $W_2$ of the third lead 33a may be larger than the width $W_1$ of the portion of the first lead 32a exposed to the bottom surface B.

In terms of the parasitic inductance, it is preferable the width $W_2$ of the third lead 33a is larger than the widths $W_1$ of the portions of the first and second leads 32a and 32b exposed to the bottom surface B. The inventors found out empirically the fact that the ESL is reduced as a lead width ratio $W_2/W_1$ of the third lead to the first lead is increased. According to the experiment, the ESL is greatly reduced when the lead width ratio $W_2/W_1$ is 1.38 or more.

Figure 5:
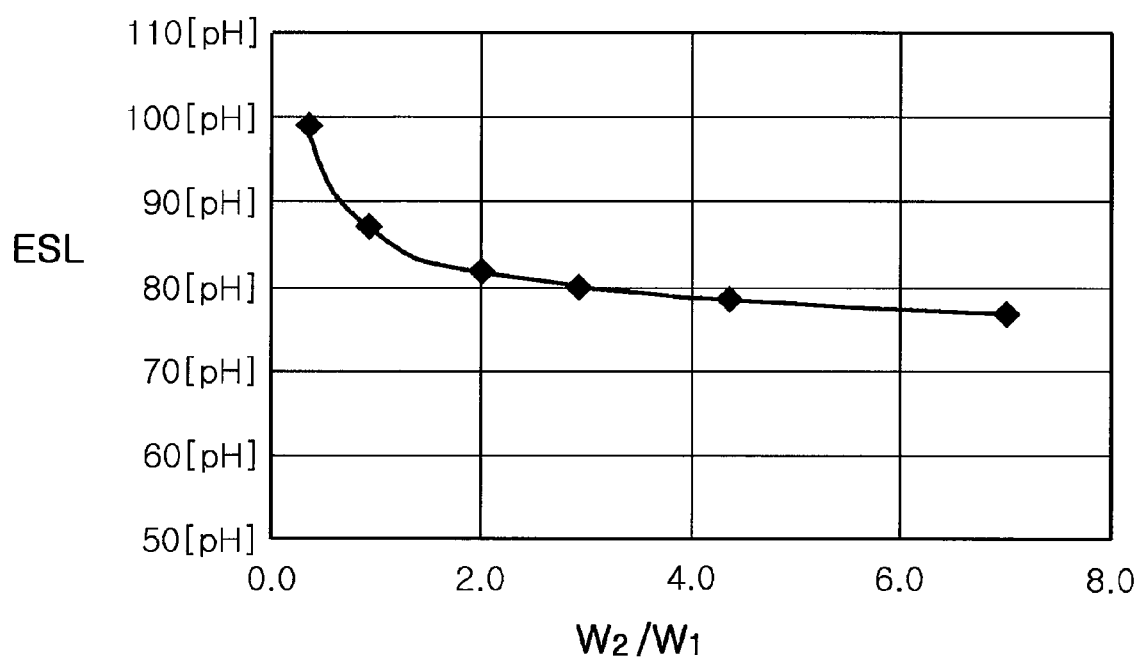
FIG. 5 is a graph illustrating a change in ESL according to a lead width ratio $W_2/W_1$ in the embodiment of FIG. 4A.

FIG. 5 is a graph illustrating a result of an ESL estimation test performed on samples of the multilayer chip capacitor 30 shown in FIG. 4. More specifically, the graph shown in FIG. 5 illustrates a change in ESL according to the lead width ratio $W_2/W_1$ of the third lead to the portion of the first (or second) lead exposed to the bottom surface B. Detailed data of the graph is listed in Table 1.

TABLE 1

| ESL | Lead Width Ratio $W_2/W_1$ |
| --- | --- |
| 99.17 [pH] | 0.30 |
| 91.17 [pH] | 0.57 |
| 87.19 [pH] | 0.92 |
| 83.43 [pH] | 1.38 |
| 81.90 [pH] | 2.00 |
| 80.15 [pH] | 2.91 |
| 78.70 [pH] | 4.35 |
| 77.12 [pH] | 7.00 |

As shown in FIG. 5 and Table 1, it can be seen that the ESL of the multilayer chip capacitor is changed according to the lead width ratio $W_2/W_1$. If the width $W_1$ is larger than the width $W_2$, for example, if the lead width ratio $W_2/W_1$ is 0.3, the ESL is 99.17 pH. As the width $W_1$ is reduced and the width $W_2$ is increased, the ESL is reduced.

Peculiarly, it can be seen that, if the lead width ratio $W_2/W_1$ is 1.38 or more, the ESL has a very small value. As shown in FIG. 5 and Table 1, if the lead width ratio $W_2/W_1$ is 0.3, the ESL is 99 pH or more, and if the lead width ratio $W_2/W_1$ is 1, the ESL is 87 pH or more. However, the lead width ratio $W_2/W_1$ is about 1.38, the ESL is greatly reduced down to the 83.43 pH or less. If the lead width ratio $W_2/W_1$ is larger than 2, the ESL is very slowly reduced according to the increase in the lead width ratio $W_2/W_1$. As a result, in order to implement a three-terminal capacitor having a minimized ESL of FIG. 4, the lead width ratio $W_2/W_1$ is preferably 1.38 or more. In addition, the ESL can be accurately controlled by adjusting the lead width ratio $W_2/W_1$.

In terms of a process of forming the external electrodes, the lead width ratio $W_2/W_1$ is preferably 7 or less. If the lead width ratio $W_2/W_1$ is more than 7, the extension width $W_{10}$ of the extension portion of the first or second external electrode extending to the bottom surface B is too small, or the widths $W_{20}$ of the second external electrode is too large. Therefore, the external electrodes cannot be accurately coated by using a conventional dip-type coating process.

Figure 6A:
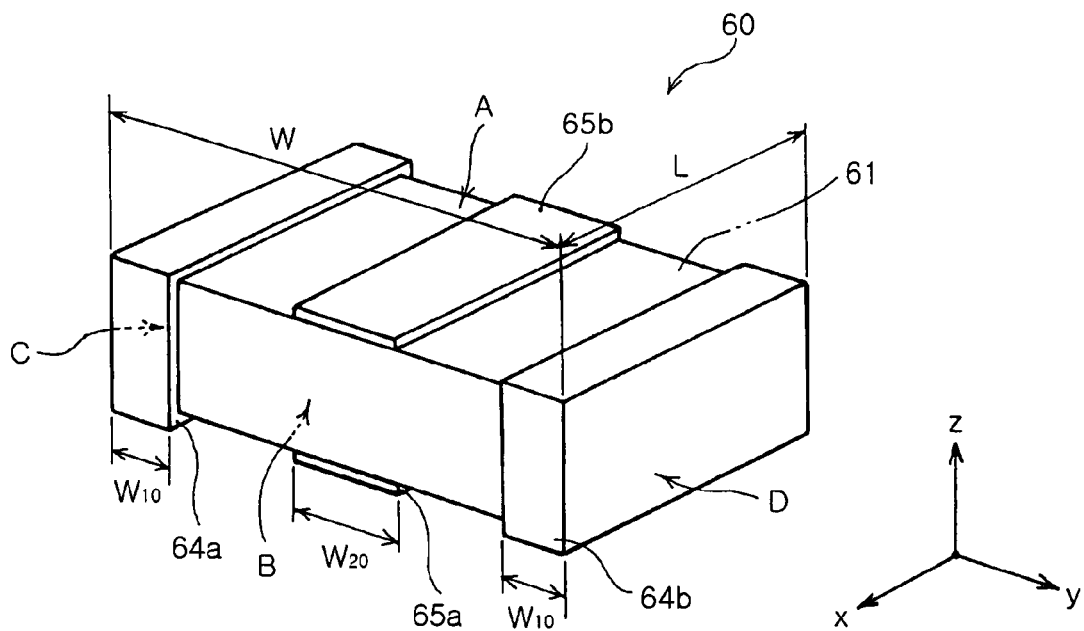
FIG. 6A is a perspective view illustrating an exterior of a multilayer chip capacitor according to another embodiment of the present invention.
Figure 6B:
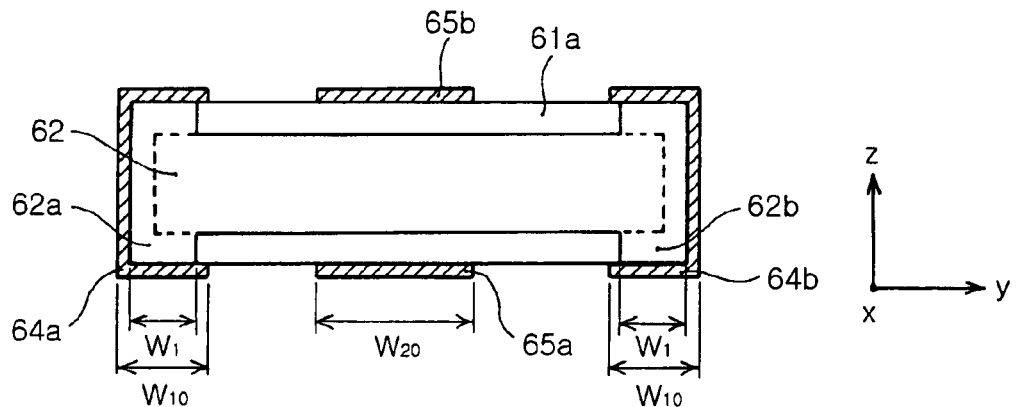
FIGS. 6B and 6C are vertical cross-sectional views illustrating a structure of internal electrodes of the capacitor.
Figure 6C:
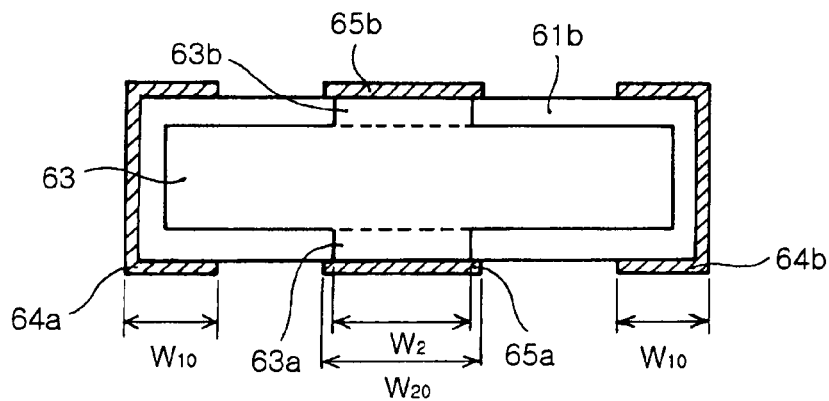

FIG. 6A is a perspective view illustrating an exterior of a multilayer chip capacitor according to another embodiment of the present invention, and FIGS. 6B and 6C are cross-sectional views illustrating structures of the fist and second internal electrodes of the capacitor of FIG. 6A. In the embodiment, the multilayer chip capacitor 60 further includes a fourth external electrode 65b connected to a second internal electrode 63. Particularly, the internal and external structures of the multilayer chip capacitor 60 have up-down symmetry.

Referring to FIG. 6A, first and second external electrodes 64a and 64b are formed on the first and second side surfaces C and D, respectively. Each of the first and second external electrodes 64a and 64b is formed to cover upper and lower edges of the side surfaces C and D and partially extend by an extension widths $W_{10}$ to a top surface A and a bottom surface B. Third and fourth external electrodes 65a and 65b are formed on the bottom and top surfaces B and A, respectively, between the first and second external electrodes to extend in the lamination direction (x direction). Particularly, the third and fourth external electrodes 65a and 65b are disposed on central portions of the bottom and top surfaces B and A, respectively, to have a predetermined extension width $W_{20}$ in a direction (y direction) perpendicular to the side surfaces C and D.

Referring to FIGS. 6B and 6C, the first and second internal electrodes 62 and 63 are formed on dielectric layers 61a and 61b, respectively. The first internal electrode 62 has an "H" shape and connected to the first and second external electrodes 64a and 64b through first and second leads 62a and 62b. The first lead 62a is formed to be drawn to the first side, top and bottom surfaces C, A and B of a capacitor body 61, and the second lead 62b is formed to be drawn to the second side, top and bottom surfaces D, A and B of the capacitor body 61.

The second internal electrode 63 is formed to have a "+" shape and connected to the third and fourth external electrodes 65a and 65b through third and fourth leads 63a and 63b. The second internal electrode 63 and the third and fourth external electrodes 65a and 65b have a polarity opposite to that of the first internal electrode 62. The leads 62a, 62b, 63a, and 63b are in contact with the external electrodes 64a, 64b, 65a, and 65b through the entire lengths of the edge portions exposed to the outer surfaces of the capacitor body 61 so as to be connected to the external electrodes 64a, 64b, 65a, and 65b, respectively. The respective leads 62a and 62b of the first internal electrode 62 are in contact with the corresponding external electrodes 64a and 64b through wide contact areas of the side, bottom, and top surfaces C (or D), B and A. Therefore, similarly to the aforementioned embodiment, the ESL is reduced.

In the embodiment, since the internal and external structures of the capacitor body have symmetry (in comparison with the embodiment of FIGS. 4A-4C), a directionality of a capacitor chip can be eliminated. When the capacitor is mounted on a circuit board, any one of the top and bottom surfaces A and B of the capacitor can be used as a mounting surface. Therefore, the capacitor can be mounted without consideration of the directionality of the mounting surface.

Figure 7A:
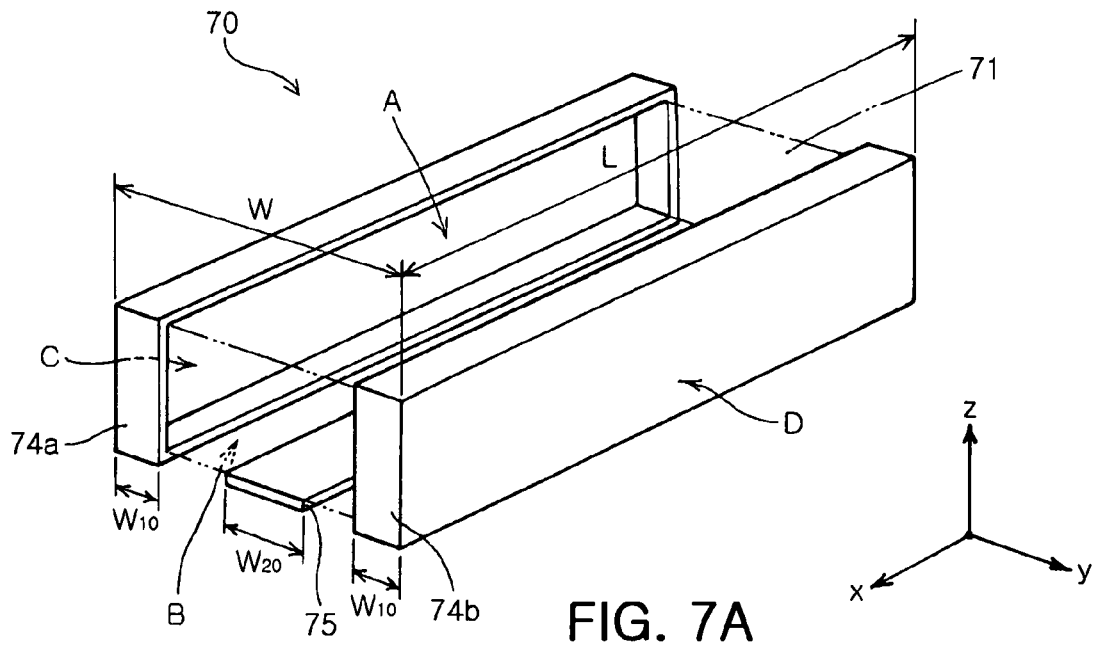
FIG. 7A is a perspective view illustrating an exterior of a multilayer chip capacitor according to still another embodiment of the present invention.
Figure 7B:
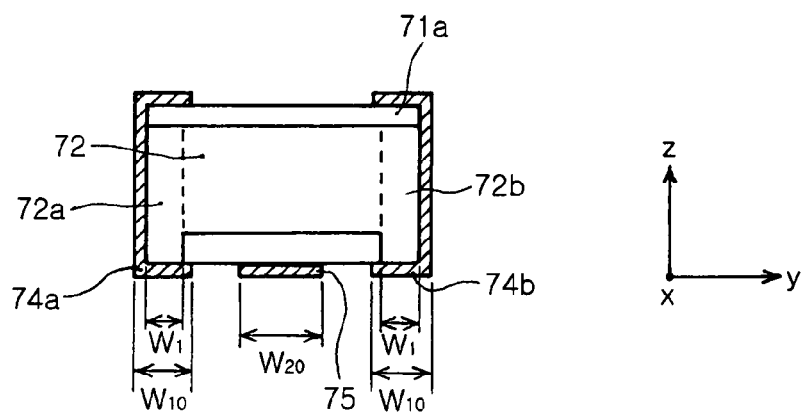
FIGS. 7B and 7C are vertical cross-sectional views illustrating a structure of internal electrodes of the capacitor.
Figure 7C:
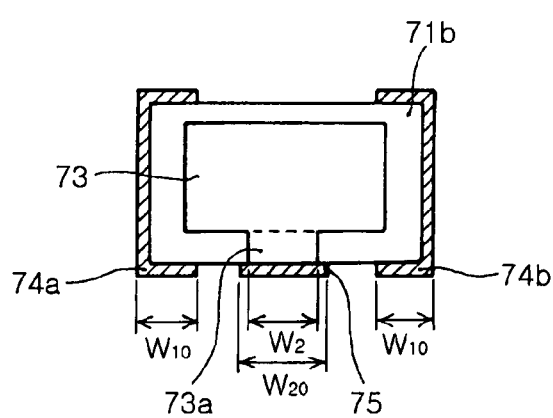

FIG. 7A is a perspective view illustrating an arrangement of external electrodes of a multilayer chip capacitor according to still another embodiment of the present invention, and FIGS. 7B and 7C are cross-sectional views illustrating structures of fist and second internal electrodes of the capacitor of FIG. 7A. The multilayer chip capacitor according to the embodiment has the same structure as that of the aforementioned embodiment of FIGS. 4A-4C except that a lamination direction (x direction) length L of a capacitor body is larger than a distance W between side surfaces which are disposed in parallel to the lamination direction.

Referring to FIG. 7, first and second external electrodes 74a and 74b having the same polarity are formed on side surfaces C and D of a capacitor body 71 of the multilayer chip capacitor 70, respectively, to partially extend by a predetermined extension width $W_{10}$ to top and bottom surfaces A and B. A third external electrode 75 having a polarity opposite to that of the first and second external electrodes 74a and 74b is formed on the bottom surface B of the capacitor body 71 to be separated from the first and second external electrodes 74a and 74b. The third external electrode 75 has a y-direction width $W_{20}$. Similarly to the aforementioned embodiment of FIGS. 4A-4C, first and second leads 72a and 72b of first internal electrode 72 are in contact with the external electrodes 74a and 74b, respectively, through wide contact areas of the side, bottom and top surfaces to be connected to the first and second external electrodes 74a and 74b, respectively. Third lead 73a of a second internal electrode 73 is in contact with the third external electrode 75 to be connected to the third external electrode 75. In FIGS. 7B and 7C, reference numerals 71a and 71b denote dielectric layers.

Particularly, the lamination direction (x direction) length L of the capacitor body 71 is larger than the distance W between the side surfaces C and D which are disposed in parallel to the lamination direction. According to the structure, the lamination number of the internal electrode can be easily increased. Due to the increase in the lamination number, it is possible to obtain larger capacitance and lower ESL.

In this embodiment, the width $W_2$ of the third lead 73a is also preferably larger than the width $W_1$ of the portion of the first or second lead 72a or 72b exposed to the bottom surface B. According to the ESL estimation test performed on samples having various lead width ratios $W_2/W_1$, the inventors found out empirically the fact that the ESL is reduced as a lead width ratio $W_2/W_1$ of the third lead to the first lead is increased.

Figure 8:
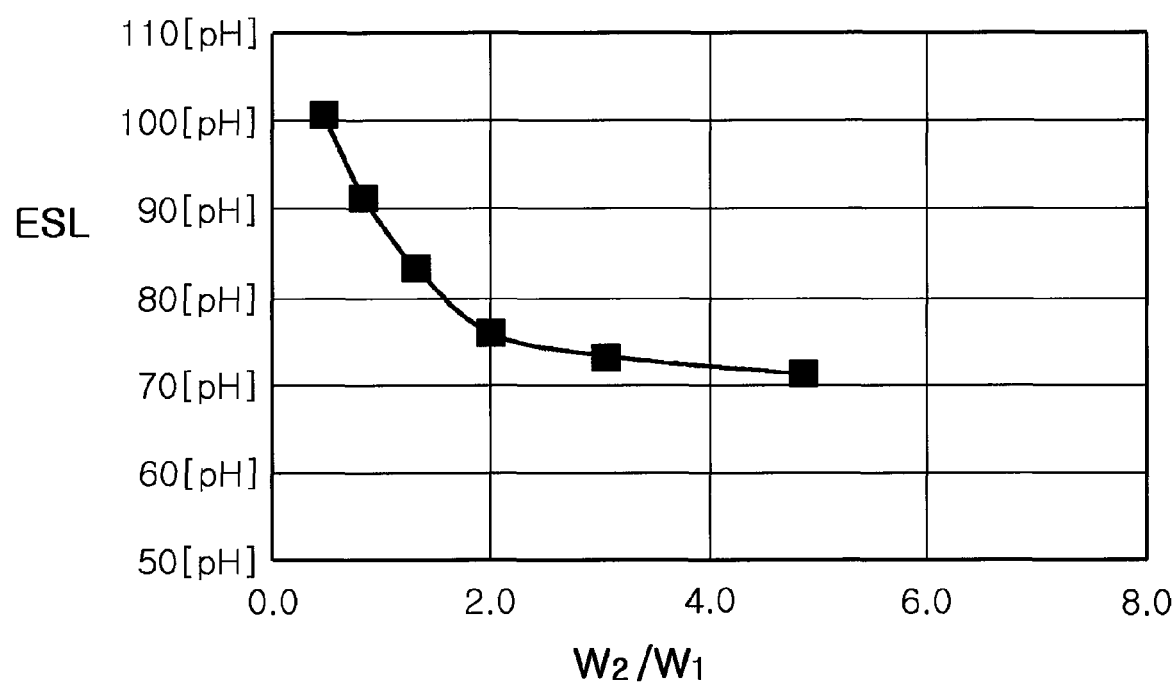
FIG. 8 is a graph illustrating a change in ESL according to a lead width ratio $W_2/W_1$ in the embodiment of FIG. 7A.

FIG. 8 is a graph illustrating a result of the ESL estimation test performed on samples of the embodiment of FIGS. 7A-7C. More specifically, the graph shown in FIG. 8 illustrates a change in ESL according to the lead width ratio $W_2/W_1$. Detailed data of the graph is listed in Table 2.

TABLE 2

| ESL | Lead width ratio $W_2/W_1$ |
| --- | --- |
| 100.67 [pH] | 0.46 |
| 91.28 [pH] | 0.82 |
| 83.34 [pH] | 1.31 |
| 76.09 [pH] | 2.00 |
| 73.53 [pH] | 3.05 |
| 71.53 [pH] | 4.86 |

As shown in FIG. 8 and Table 2, if the lead width ratio $W_2/W_1$ is 0.82 or less, the ESL is more than 90 pH. If the lead width ratio $W_2/W_1$ is 2 ore more, the ESL is 76.09 pH or less, which is very small value. In the lead width ratio $W_2/W_1$ range of 2 or more, the ESL is slowly reduced as the lead width ratio $W_2/W_1$ is increased. In terms of a process of forming the external electrodes, the lead width ratio $W_2/W_1$ is preferably 7 or less.

Accordingly, in case that the lamination direction length L of the capacitor body is larger than the distance W between side surfaces C and D as shown in FIG. 7, the lead width ratio $W_2/W_1$ is preferably set to 2.0 or more so that a high-performance decoupling capacitor or EMI filter having a remarkably reduced ESL can be implemented.

Figure 9A:
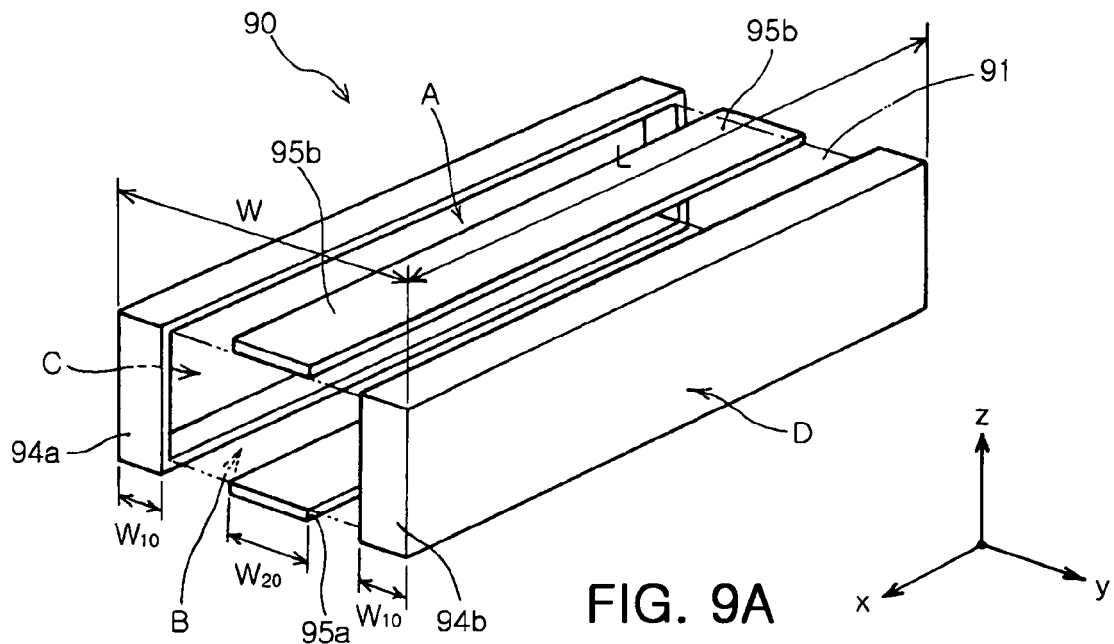
FIGS. 9A and 9B are vertical cross-sectional views illustrating a structure of internal electrodes of the capacitor.
Figure 9B:
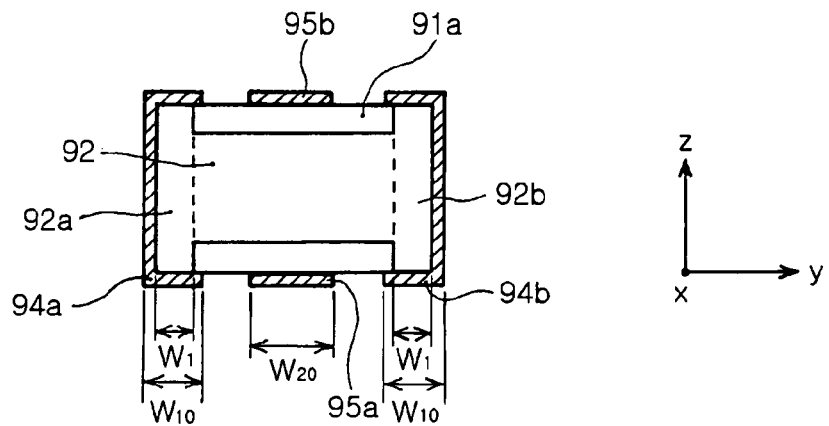
Figure 9C:
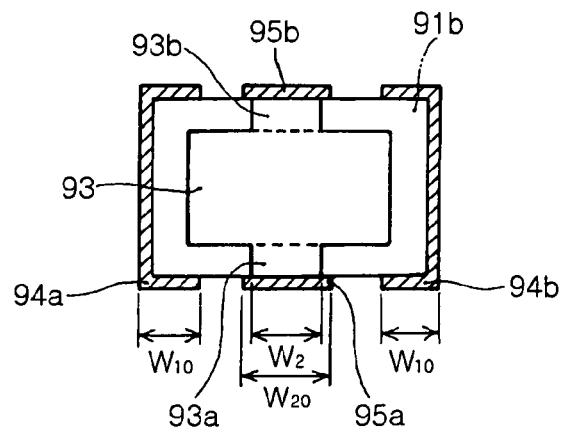
FIG. 9 is a perspective view illustrating an exterior of a multilayer chip capacitor according to further still another embodiment of the present invention.

FIG. 9A is a perspective view illustrating an arrangement of external electrodes of a multilayer chip capacitor according to another embodiment of the present invention, and FIGS. 9B and 9C are cross-sectional views illustrating structures of fist and second internal electrodes of the capacitor of FIG. 9A. The multilayer chip capacitor 90 further includes a fourth external electrode 95b which is formed on a top surface A to be connected to a second internal electrode 93. The internal and external structures of the multilayer chip capacitor 90 have up-down symmetry. In addition, a lamination direction (x direction) length L of the capacitor body 91 is larger than a distance W between side surfaces C and D.

Referring to FIG. 9A, first and second external electrodes 94a and 94b are formed on the first and second side surfaces C and D, respectively. Each of the first and second external electrodes 94a and 94b is formed to cover upper and lower edges of the corresponding side surface C or D and partially extend by an extension width $W_{10}$ to a top surface A and a bottom surface B. The third and fourth external electrodes 95a and 95b are formed on the bottom surface B and the top surface A, respectively, between the first external electrode and the second external electrode to extend in the lamination direction (x direction), respectively. Particularly, the third and fourth external electrodes 95a and 95b are disposed on central portions of the bottom surface B and the top surface A, respectively. Each of the third and fourth external electrodes 95a and 95b has a width $W_{20}$ in a direction (y direction) perpendicular to the side surfaces C and D.

Referring to FIGS. 9B and 9C, first and second internal electrode 92 and 93 are formed on dielectric layers 91a and 91b, respectively. The first internal electrode 92 is connected to the first and second external electrodes 94a and 94b through the first and second leads 92a and 92b. Particularly, the fist lead 92a is formed to be drawn to the first side, top and bottom surfaces C, A and B of the capacitor body 91, and the second lead 92b is formed to be drawn to the second side, top and bottom surface D, A, and B of the capacitor body 91.

The second internal electrode 93 is connected to the third and fourth external electrodes 95a and 95b through third and fourth leads 93a and 93b. Therefore, the second internal electrode 93 and the third and fourth external electrodes 95a and 95b have a polarity opposite to that of the first internal electrode 92. The first to fourth leads 92a, 92b, 93a and 93b are in contact with the external electrodes 94a, 94b, 95a and 95b through the entire lengths of the edge portions exposed to the outer surfaces of the capacitor body 91 so as to be connected to the external electrodes 94a, 94b, 95a and 95b, respectively.

The respective leads 92a and 92b of the first internal electrode 92 are in contact with the corresponding external electrodes 94a and 94b through wide contact areas of the side, bottom, and top surfaces C (or D), B, and A, so that the ESL is reduced. Since the internal and external structures of the capacitor body have up-down symmetry, any one of the top and bottom surfaces A and B of the capacitor body can be used as a mounting surface. Therefore, the capacitor can be mounted without consideration of the directionality of the mounting surface. In addition, since the lamination direction (x direction) length L of the capacitor body is larger than the distance W between the side surfaces C and D, the lamination number of the internal electrodes can be easily increased. Due to the increase in the lamination number, it is possible to obtain larger capacitance and lower ESL.

According to the embodiments, it is possible to reduce the number of external electrodes and increase the number of current loops (current loops formed by currents flowing from or to the mounting circuit board) connected in parallel. This advantage can bee seen from FIG. 10.

Figure 10:
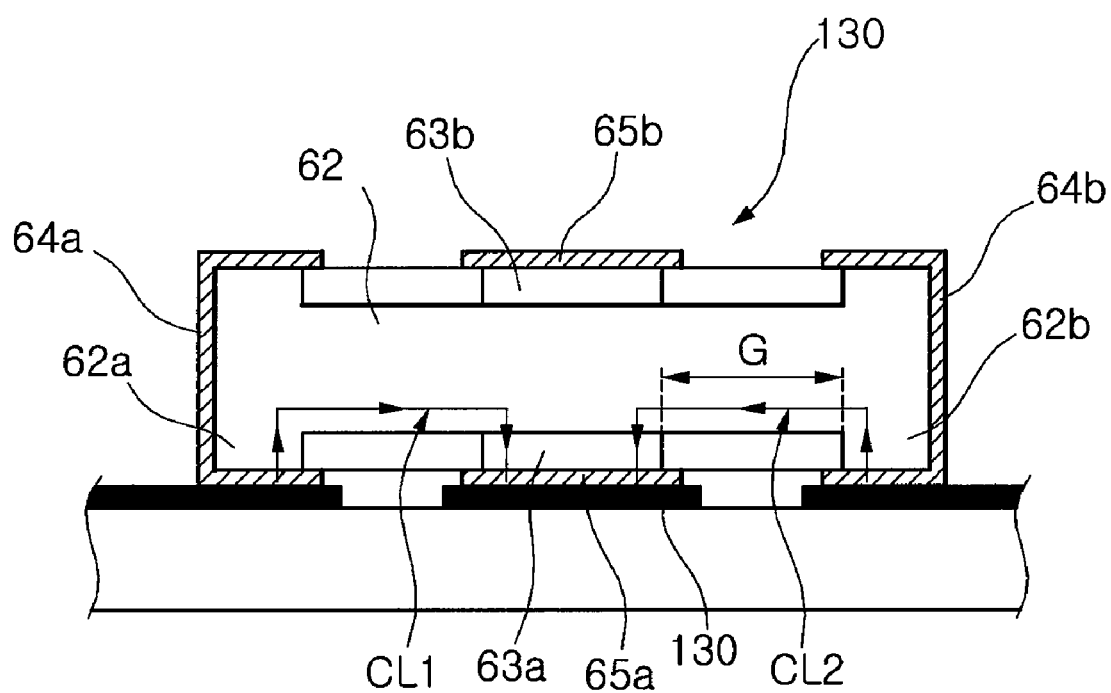
FIG. 10 is a schematic cross-sectional side view illustrating current loops generated during an operation of the multilayer chip capacitor according to the embodiment of the present invention.

FIG. 10 is a schematic cross-sectional side view illustrating current loops generated during an operation of the multilayer chip capacitor according to the embodiment of the present invention. For the convenience of description, FIG. 10 illustrates only the current loops in the capacitor of FIG. 6A. However, it can be understood by the ordinarily skilled in the art that the current loops are to be similarly generated in the capacitors of FIGS. 4A, 7A and 9A. In addition, the current loops are to be similarly generated in capacitors of FIGS. 16 and 17 described later.

As seen from a direction perpendicular to a surface of the internal electrode in FIG. 10, a current loop CL1 is generated by a current flowing from the first external electrode 64a through the first and second internal electrodes 62 and 63 to the third external electrode 65a during the operation of the capacitor. Simultaneously, a current loop CL2 is generated by a current flowing from the second external electrode 64b through first and second internal electrodes 62 and 63 to the third external electrode 65a. The two parallel-connected current loops CL1 and CL2 can be implemented by using only three or four external electrodes, so that it is possible to reduce the number of external electrodes and obtain low ESL.

According to an experiment, the inventors found out that the ESL of the capacitor can be controlled by adjusting the four design factors as described below. Particularly, it is found out that the ESL of the capacitor can be reduced down to 100 pH or less.

Figure 11:
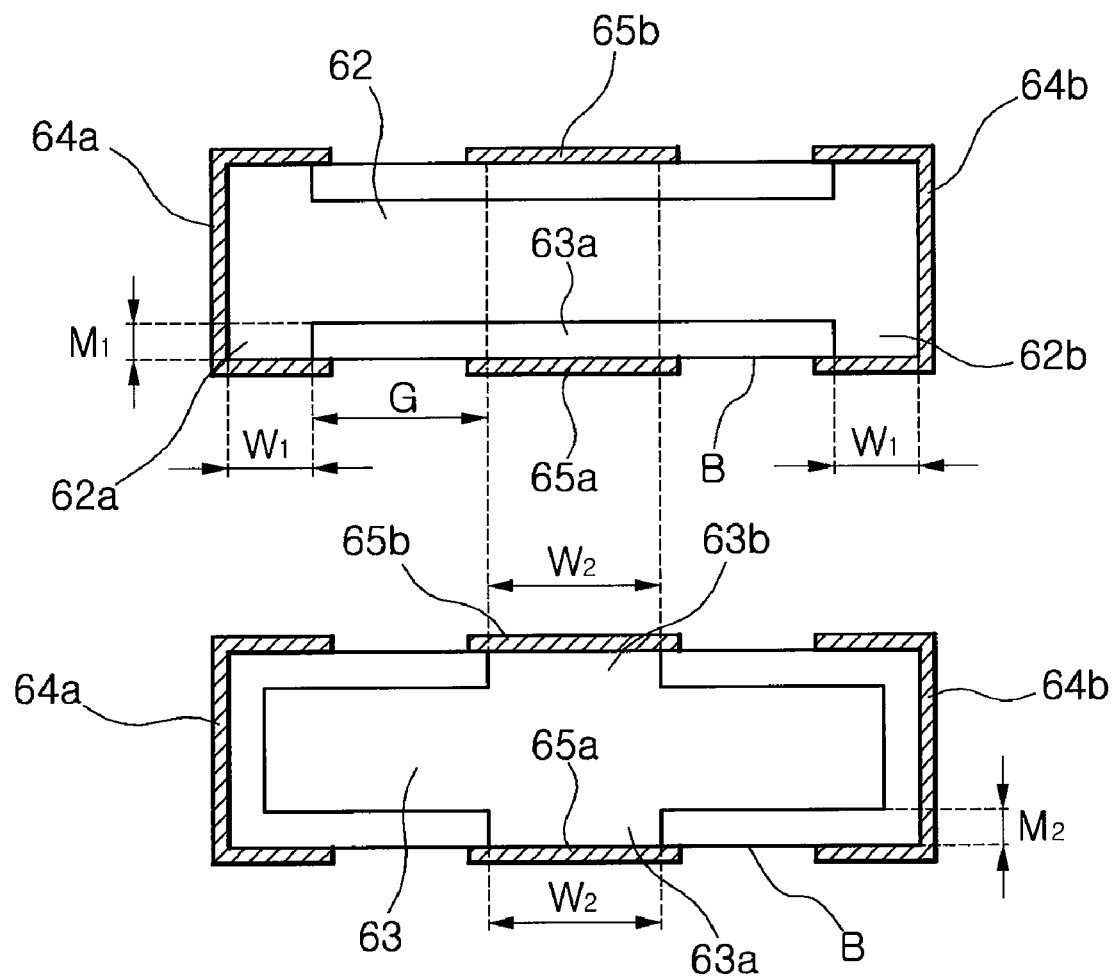
FIG. 11 is a vertical cross-sectional view illustrating a gap G between adjacent leads of opposite polarities, widths $W_1$ and $W_2$ of leads, and distances $M_1$ and $M_2$ from main portions of internal electrodes to a bottom surface in the multilayer chip capacitor of FIG. 10.

FIG. 11 is a vertical cross-sectional view illustrating a gap G between leads of adjacent internal electrodes, widths $W_1$ and $W_2$ of leads, and distances $M_1$ and $M_2$ from main portions of the internal electrodes to the bottom surface in the multilayer chip capacitor of FIG. 10. The gap G is an interval between adjacent leads 62a and 63a having different polarities. The distance $M_1$ is a distance from the main portion of the first internal electrode 62 to the bottom surface B of the capacitor body, and the distance $M_2$ is a distance from the main portion of the second internal electrode 63 to the bottom surface B. In the embodiment, $M_1=M_2=M$.

Figure 12:
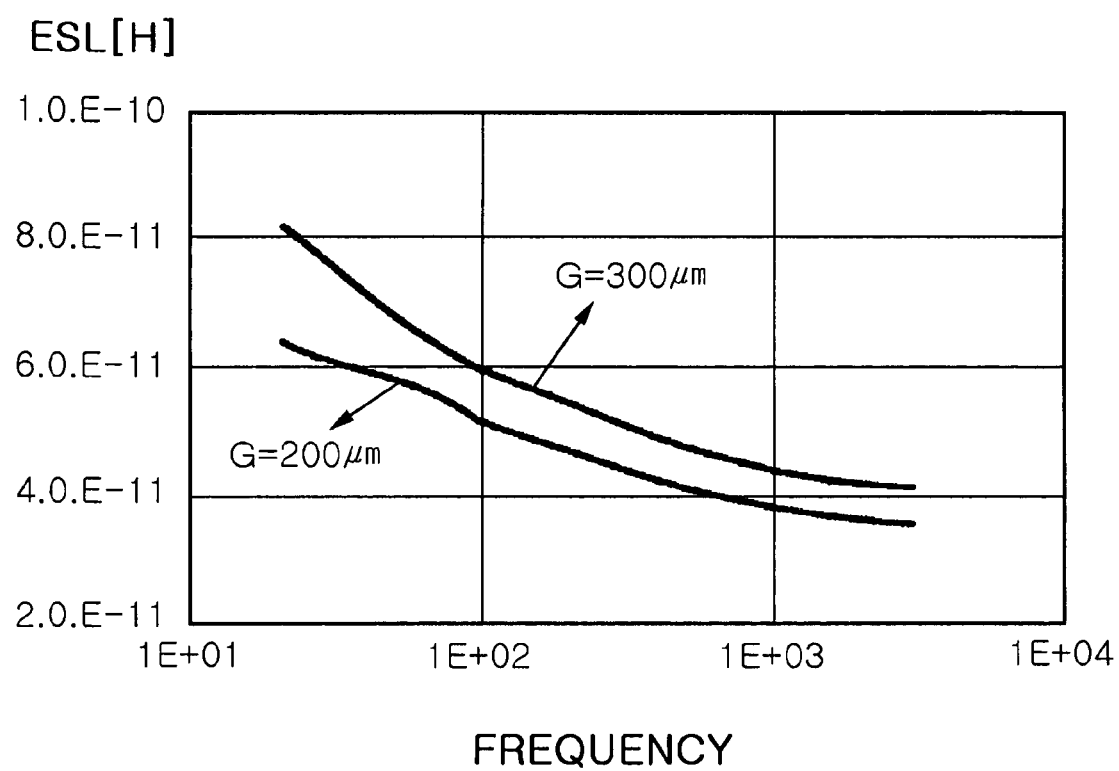
FIG. 12 is a graph illustrating a characteristic of ESL (H) to a frequency (MHz) in the multilayer chip capacitors having different gaps G shown in FIG. 11.

FIG. 12 is a graph illustrating a characteristic of the ESL (H) to a frequency (MHz) in the multilayer chip capacitors having different gaps G shown in FIG. 11. The graph of the ESL characteristic of the multilayer chip capacitor 60 shown in FIG. 12 is obtained in a case where the distance $M(=M_1=M_2)$ is 100 µm, a lead width ratio $W_2/W_1$ is 6.0, and the lamination number of internal electrodes is 200. As shown in FIG. 12, at the frequency of 10 MHz or more, the multilayer chip capacitors having the gap G of 300 µm and the gap G of 200 µm exhibit low ESL of 100 pH or less. As the gap G is smaller, the ESL is further reduced. As the gap G is smaller, the areas of the current loops CL1 and CL2 shown in FIG. 10 are reduced, and the inductance induced from the current loops are thus reduced.

Figure 13:
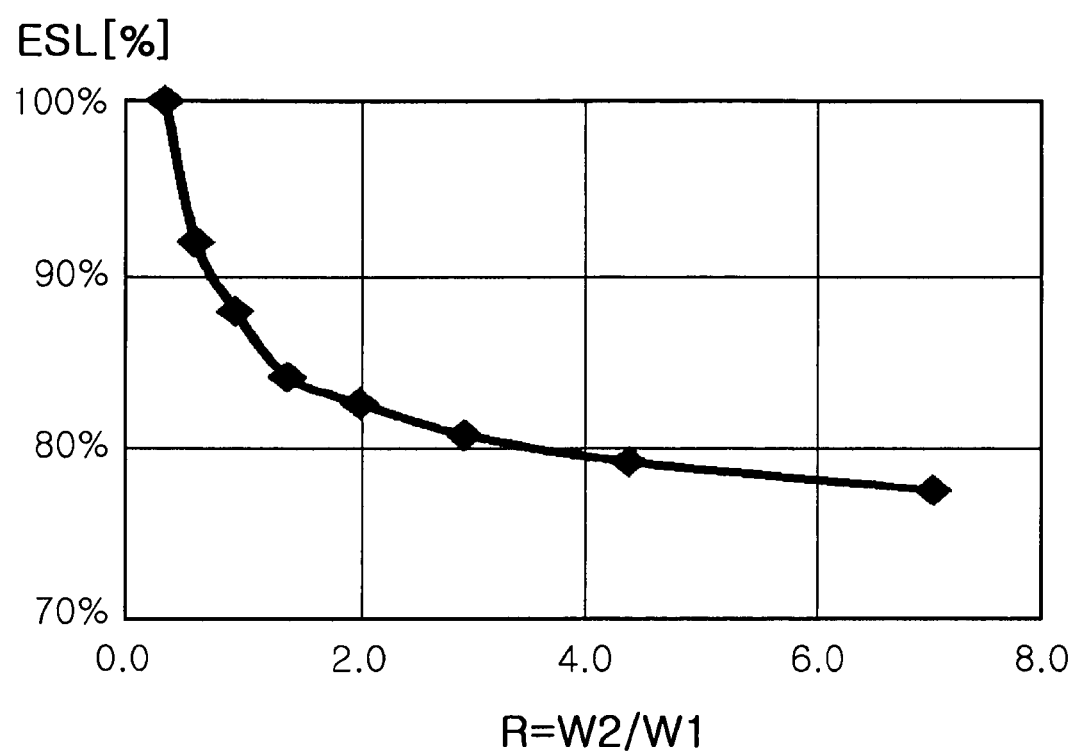
FIG. 13 is a graph illustrating a change in a relative value of ESL according to a lead width ratio $W_2/W_1$ in the multilayer chip capacitor of FIG. 11.

FIG. 13 is a graph illustrating a change in a relative value (%) of ESL according to the lead width ratio R (=$W_2/W_1$) in the multilayer chip capacitor of FIG. 11. The graph of the relative value (%) of ESL of the multilayer chip capacitor 60 shown in FIG. 12 is obtained in a case where the distance M is 100 µm, the gap G is 200 µm, and the lamination number of internal electrodes is 50. In addition, the graph of the relative value (%) of ESL is obtained based on the reference value of ESL which is set to 100 when $W_2/W_1$=0.3. As shown in the graph of FIG. 13, as the lead width ratio $W_2/W_1$ is larger, the ESL is further reduced. Particularly, it can be seen that, in case of the lead width ratio $W_2/W_1$ of about 1.38, the reduction rate (or slope) of ESL is greatly changed.

Figure 14:
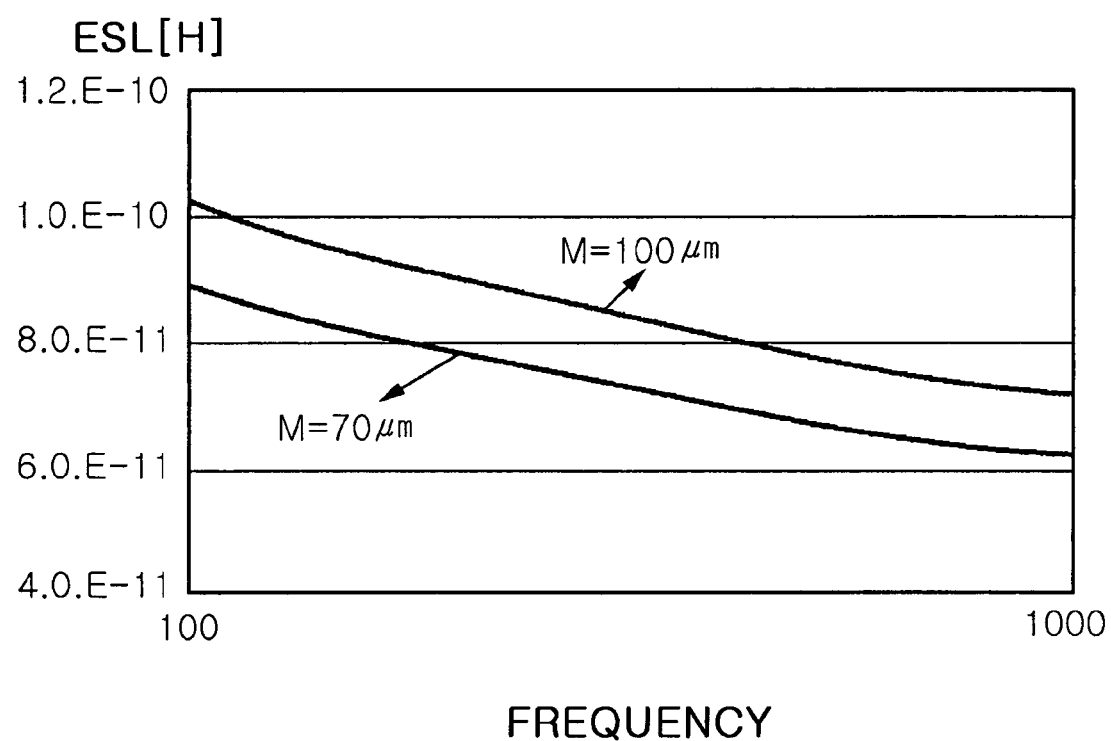
FIG. 14 is a graph illustrating a characteristic of ESL (H) to a frequency (MHz) in the multilayer chip capacitors having different distance $M(=M_1=M_2)$ shown in FIG. 11.

FIG. 14 is a graph illustrating a characteristic of the ESL (H) to a frequency (MHz) in the multilayer chip capacitors having different distances M shown in FIG. 11. The graph of the ESL characteristic of the multilayer chip capacitor 60 shown in FIG. 14 is obtained in a case where the gap G is 200 µm, a lead width ratio $W_2/W_1$ is 6.0, and the lamination number of internal electrodes is 50. As shown in FIG. 14, over the frequency range of 100 to 1,000 MHz (excluding the frequency region near 100 MHz), the multilayer chip capacitors having the distance M of 100 µm exhibit low ESL of 100 pH or less. When the distance M is 70 µm, the ESL is lower than 100 pH over the entire range of 100 to 1,000 MHz. As the distance M is smaller, the areas of the current loops CL1 and CL2 shown in FIG. 10 are reduced, and the inductance of the capacitor is thus reduced.

Figure 15:
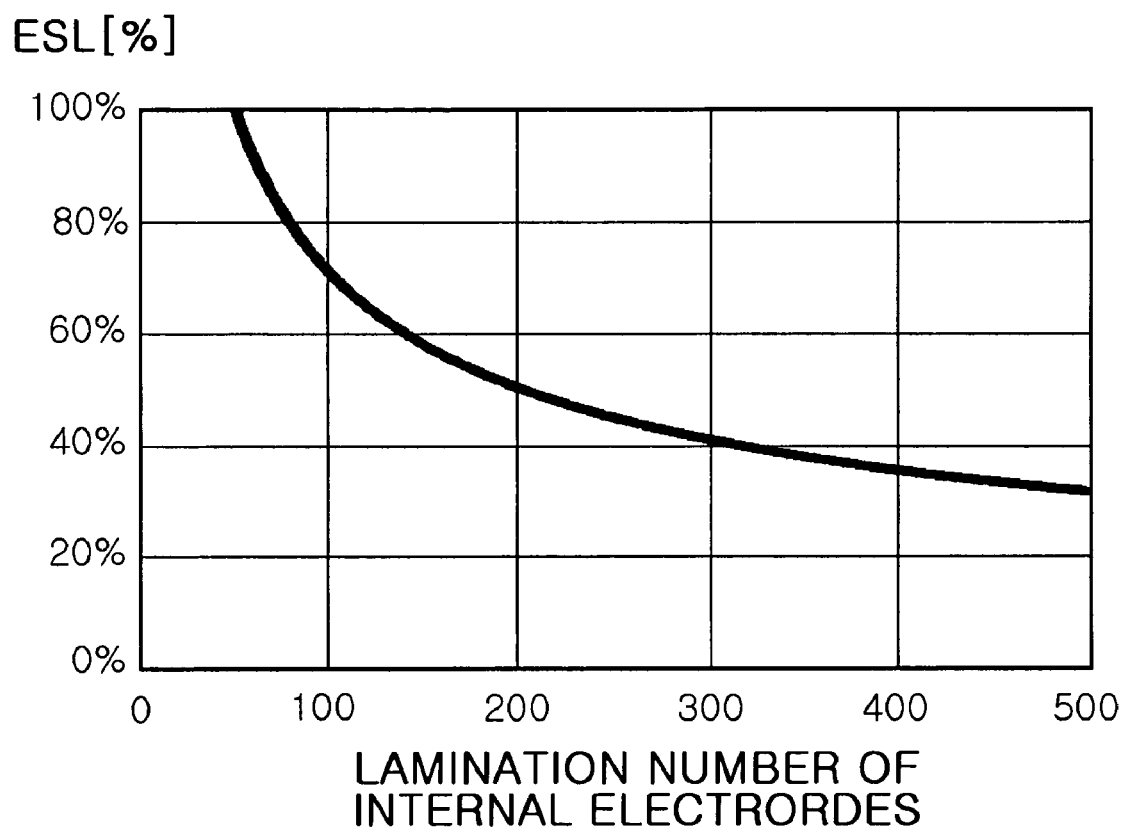
FIG. 15 is a graph illustrating a change in a relative value (%) of ESL according to the number of internal electrodes in the multilayer chip capacitor of FIG. 11.

FIG. 15 is a graph illustrating a change in a relative value (%) of ESL according to the lamination number of internal electrodes in the capacitor of FIG. 11. The vertical arrangement of the internal electrodes has the advantage of further reduction in ESL according to the increase in the lamination number of internal electrodes. The graph of FIG. 15 is obtained in a case where the distance M is 100 µm, the gap G is 200 µm, and the lead width ratio $W_2/W_1$ is 6.0. As shown in FIG. 15, as the lamination number of internal electrodes is increased, the ESL is reduced.

As described above, it can be seen that the inductance or ESL characteristic of the multilayer chip capacitor is changed according to the four design factors: the gap G, the lead width ratio $W_2/W_1$, the distance M, and the lamination number of internal electrodes. By adjusting the four design factors, the decoupling capacitor having the ESL of 100 pH or less which is required for a high speed MPU package can be implemented. The aforementioned ESL (or inductance) behaviors according to the four design factors are not limited to the multilayer chip capacitor according to the embodiment of FIG. 11 (or FIG. 6). The multilayer chip capacitor of FIG. 4 (or FIG. 3) in which the fourth external electrode is not provided on the top surface has similar ESL characteristics according to the 4 design factors. The fourth external electrode 65b is provided for the convenience of mounting of the capacitor (the capacitor can be mounted on the circuit board without difference of the top and bottom surfaces thereof), but the fourth external electrode 65b does not contribute significantly to an actual current path.

Figure 16A:
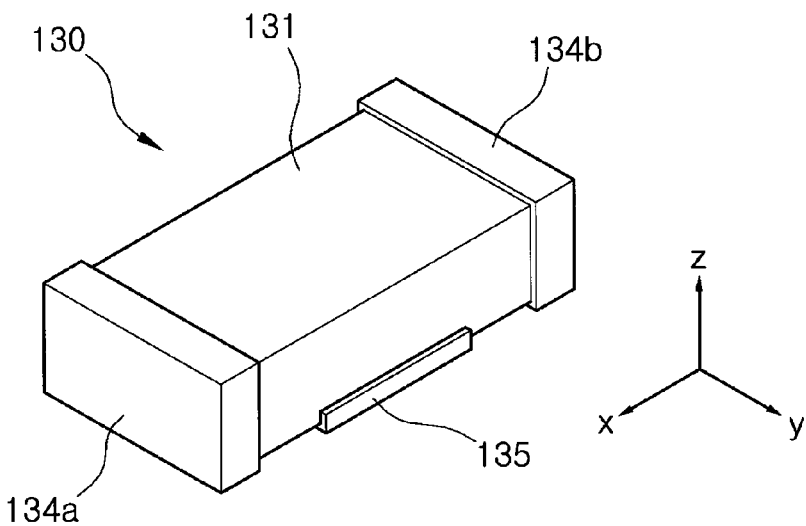
FIG. 16A is a perspective view illustrating an exterior of a multilayer chip capacitor according to further still another embodiment of the present invention.
Figure 16B:
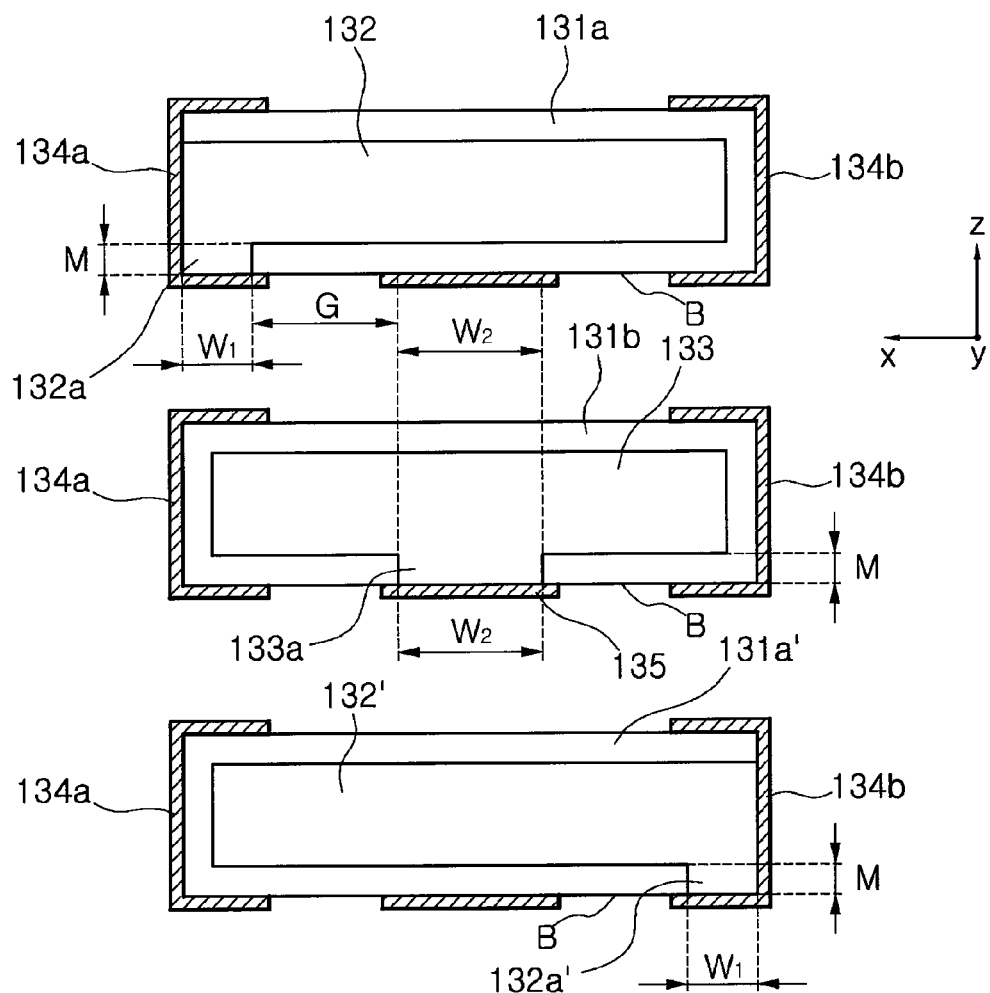
FIG. 16B is a vertical cross-sectional view illustrating a structure of internal electrodes of the capacitor.

FIG. 16A is a perspective view illustrating an exterior of a multilayer chip capacitor according to still another embodiment, and FIG. 16B is a vertical cross-sectional view illustrating a structure of internal electrodes of the capacitor of FIG. 16A. In the aforementioned embodiments, the internal electrodes having the same polarity have the same electrode pattern. On the contrary, in the embodiment of FIGS. 16A and 16B, the internal electrodes having the same polarity have two types of electrode patterns. The internal electrodes 132, 132', and 133 are disposed vertically on a bottom surface (a surface to be mounted on a circuit board).

Referring to FIG. 16A, the outer appearance of the multilayer chip capacitor 130 is similar to that of the multilayer chip capacitor 30 of FIG. 3A or 4A. First and second external electrodes 134a and 134b having the same polarity are formed on first and second side surfaces of a capacitor body 131, respectively, and cover upper and lower edges of the side surfaces and partially extend a top surface and a bottom surface B. A third external electrode 135 having an opposite polarity is formed on the bottom surface B in the lamination direction (y direction) between the first and second external electrodes 134a and 134b.

Referring to FIGS. 16A and 16B, in the capacitor body 131, a first internal electrode pattern 132 of a first polarity and a second internal electrode pattern 132' of the first polarity are alternately disposed on dielectric layers 131a and 131a'. In addition, a third internal electrode pattern 133 of a second polarity is formed on a dielectric layer 131b between the first and second internal electrode patterns 132 and 132' of the first polarity. In this manner, the first, third, and second internal electrode patterns 132, 133, 132' are alternately disposed in the order of 132, 133, 132', 133, 132, 133, 132', 133 . . . . In the arrangement of the internal electrodes, the first-polarity internal electrode 132 or 132' and the second-polarity internal electrode 133 are alternately disposed to face each other with the dielectric layer interposed therebetween, and the first and second internal electrode pattern 132 and 132' having the first polarity are alternately disposed in the lamination direction (y direction). In this manner, the first-polarity internal electrodes have the two types of electrode patterns 132 and 132', and the second-polarity internal electrodes have one type of electrode pattern 133.

As shown in FIG. 16B, the first internal electrode pattern 132 is connected to a first external electrode 134a through a first lead 132a drawn to the first side surface and the bottom surface B. The second internal electrode pattern 132' is connected to a second external electrode 134b through a second lead 132a' drawn to the second side surface and the bottom surface B. The third internal electrode pattern 133 is connected to a third external electrode 135 through a third lead 133a drawn to the bottom surface B.

The first and second leads 132a and 132a' are in contact with the first and second external electrodes 134a and 134b, respectively, through the entire lengths of the lead edge exposed to the side surfaces and the bottom surface to be connected to the first and second external electrodes 134a and 134b, respectively. Therefore, the contact areas between the internal electrodes and external electrodes can be increased, and the paths of currents flowing through the contact areas have wide widths. The third lead 133 is in contact with the third external electrode 135 through the entire length of the lead edge exposed to the bottom surface to be connected to the third external electrode 135.

Similarly to the embodiments shown in FIGS. 11 to 15, in the embodiment shown in FIG. 16, the ESL of the multilayer chip capacitor is changed according to the four design factors: the gap G, the lead width ratio $W_2/W_1$, the distance M, and the lamination number of internal electrodes. By adjusting the four design factors, the multilayer chip capacitor having the ESL of 100 pH or less can be implemented. Since the multilayer chip capacitor shown in FIG. 16 is not different from the multilayer chip capacitor shown in FIG. 4 except that the first-polarity internal electrodes have the two types of electrode patterns, the multilayer chip capacitor shown in FIG. 16 has substantially the same ESL behaviors as those of the multilayer chip capacitors shown in FIGS. 11 to 15.

Figure 17A:
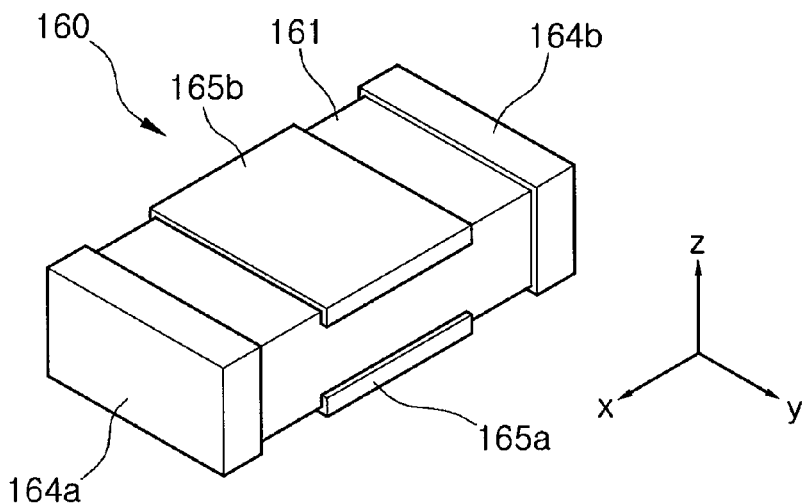
FIG. 17A is a perspective view illustrating an exterior of a multilayer chip capacitor according to a modified example of the embodiment of FIG. 16.
Figure 17B:
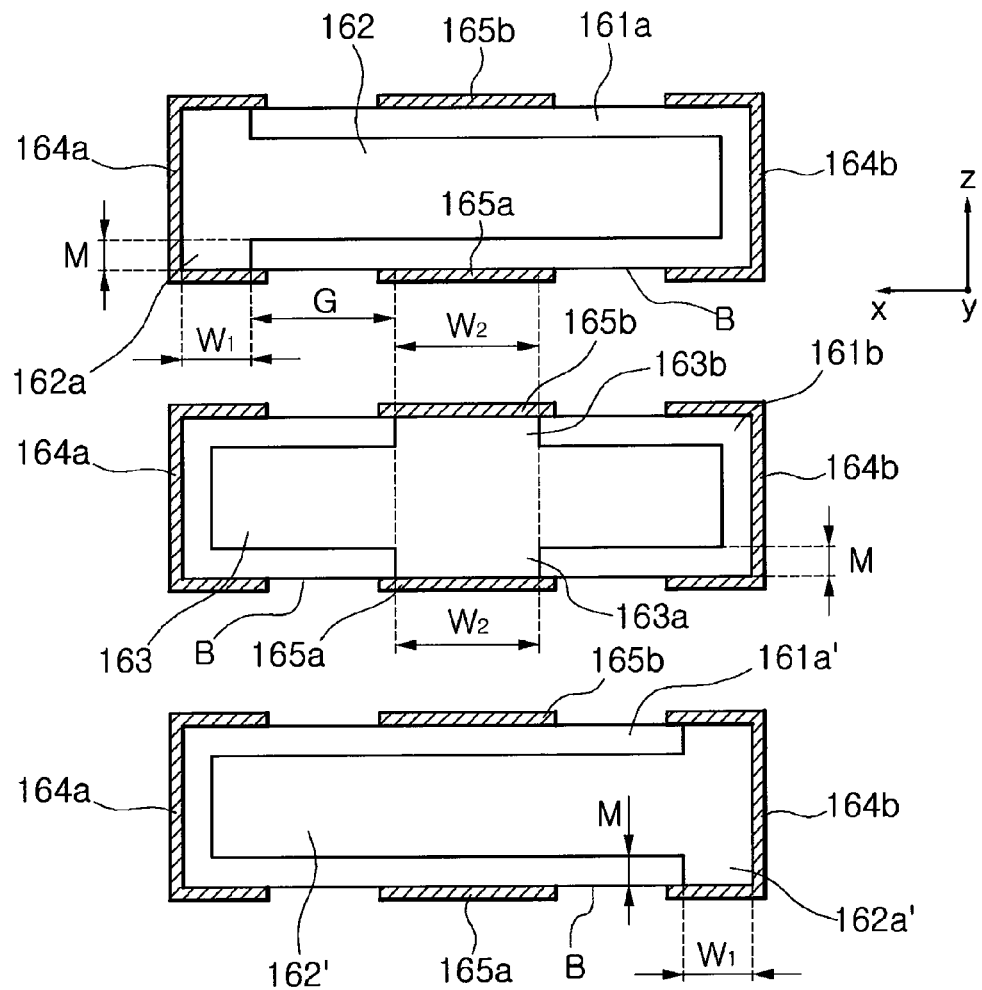
FIG. 17B is a vertical cross-sectional view illustrating a structure of internal electrodes of the capacitor.

FIG. 17A is a perspective view illustrating an exterior of a multilayer chip capacitor according to a modified example of the embodiment shown in FIG. 16A, and FIG. 17B is a vertical cross-sectional view illustrating a structure of internal electrodes. The multilayer chip capacitor 160 shown in FIG. 17A is different from the multilayer chip capacitor 130 shown in FIG. 16A in that the multilayer chip capacitor further includes a fourth external electrode 165b on the top surface and has up-down symmetry in the external and internal structures.

Referring to FIG. 17A, the outer appearance of the multilayer chip capacitor 160 is substantially the same as that of the multilayer chip capacitor 60 of FIG. 6A. First and second external electrodes 164a and 164b having the same polarity are formed on first and second side surfaces C and D of a capacitor body 161, respectively. The first and second external electrodes 164a and 164b are formed to cover upper and lower edges of the corresponding side surfaces C and D and partially extend a top surface A and a bottom surface B. The third and fourth external electrodes 165a and 165b having a polarity opposite to that of the first and second external electrodes 164a and 164b are formed on the bottom surface B and the top surface, respectively, in the lamination direction (y direction).

Referring to FIGS. 17A and 17B, a first internal electrode pattern 162 of a first polarity and a second internal electrode pattern 162' of the first polarity are alternately disposed on dielectric layers 161a and 161a' in a capacitor body 161. In addition, a third internal electrode pattern 163 of a second polarity formed on a dielectric layer 161b is disposed between the first and second internal electrode patterns 162 and 162'. All the first-polarity internal electrodes 162 and 162' have "T"-shaped electrode patterns. The two "T"-shaped electrode patterns 162 and 162' positioned in opposite directions are alternately and repeatedly disposed along the stacking direction, so that a plurality of first-polarity internal electrodes are formed. All the third internal electrode pattern 163 have "+"-shaped electrode patterns.

As shown in FIG. 17B, the first internal electrode pattern 162 of the first polarity is connected to the first external electrode 164a through a first lead 162a drawn to the first side surface, the bottom surface and the top surface. The second internal electrode pattern 162' of the first polarity is connected to the second external electrode 164b through a second lead 162a' drawn to the second side surface, the bottom surface and the top surface. The third internal electrode pattern 163 of the second polarity is connected to the third and fourth external electrodes 165a and 165b through third and fourth leads 163a and 163b drawn to the bottom surface and the top surface, respectively.

The first and second leads 162a and 162a' are in contact with the first and second external electrodes 164a and 164b through the entire lengths of the lead edges exposed to the side surfaces and the bottom surface to be connected to the first and second external electrodes 164a and 164b, respectively. Therefore, the contact areas between the internal and external electrodes are increased, and the paths of currents flowing through the contact areas have wide widths. The third lead 163 is in contact with the third external electrode 165 through the entire length of the lead edge exposed to the bottom surface to be connected to the third external electrode 165.

Since the internal and external structures of the capacitor body 160 have up-down symmetry (in comparison with the embodiment of FIG. 16), a directionality of a capacitor chip can be eliminated. When the capacitor is mounted on a circuit board, any one of the top and bottom surfaces of the capacitor can be used as a mounting surface, and thus the capacitor can be mounted without consideration of the directionality of the mounting surface.

Similarly to the embodiments shown in FIGS. 11 to 15, the ESL of the multilayer chip capacitor 160 is changed according to the four design factors: the gap G, the lead width ratio $W_2/W_1$, the distance M, and the lamination number of internal electrodes. By adjusting the four design factors, the multilayer chip capacitor having the ESL of 100 pH or less can be implemented. Since the multilayer chip capacitor shown in FIG. 17 is not different from the multilayer chip capacitor shown in FIG. 6 (or FIG. 11) except that the first-polarity internal electrodes has the two types of electrode patterns, the multilayer chip capacitor shown in FIG. 17 has substantially the same ESL behaviors as those of the multilayer chip capacitors shown in FIGS. 11 to 15.

Figure 18A:
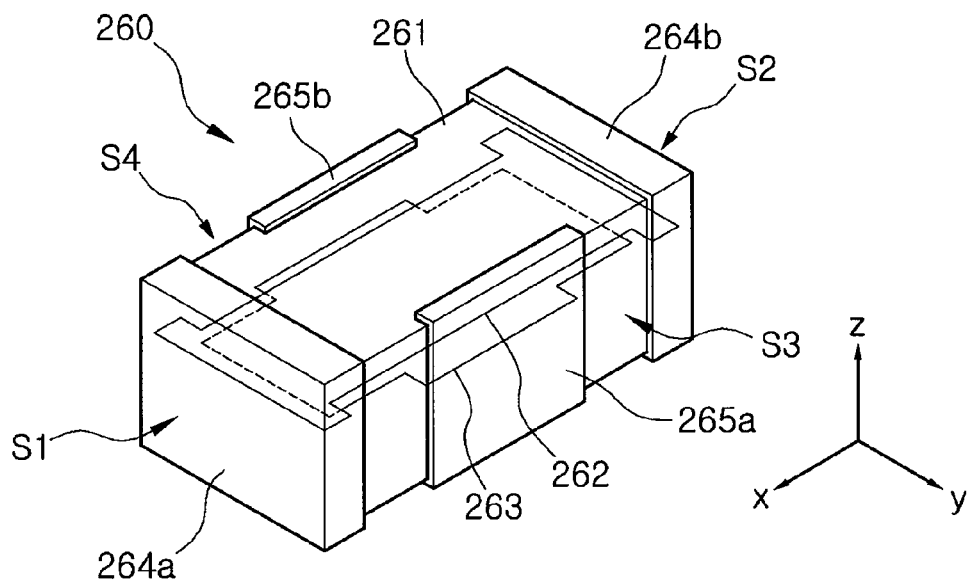
FIG. 18A is a perspective view illustrating an outer appearance of a multilayer chip capacitor according to further still another embodiment of the present invention.
Figure 18B:
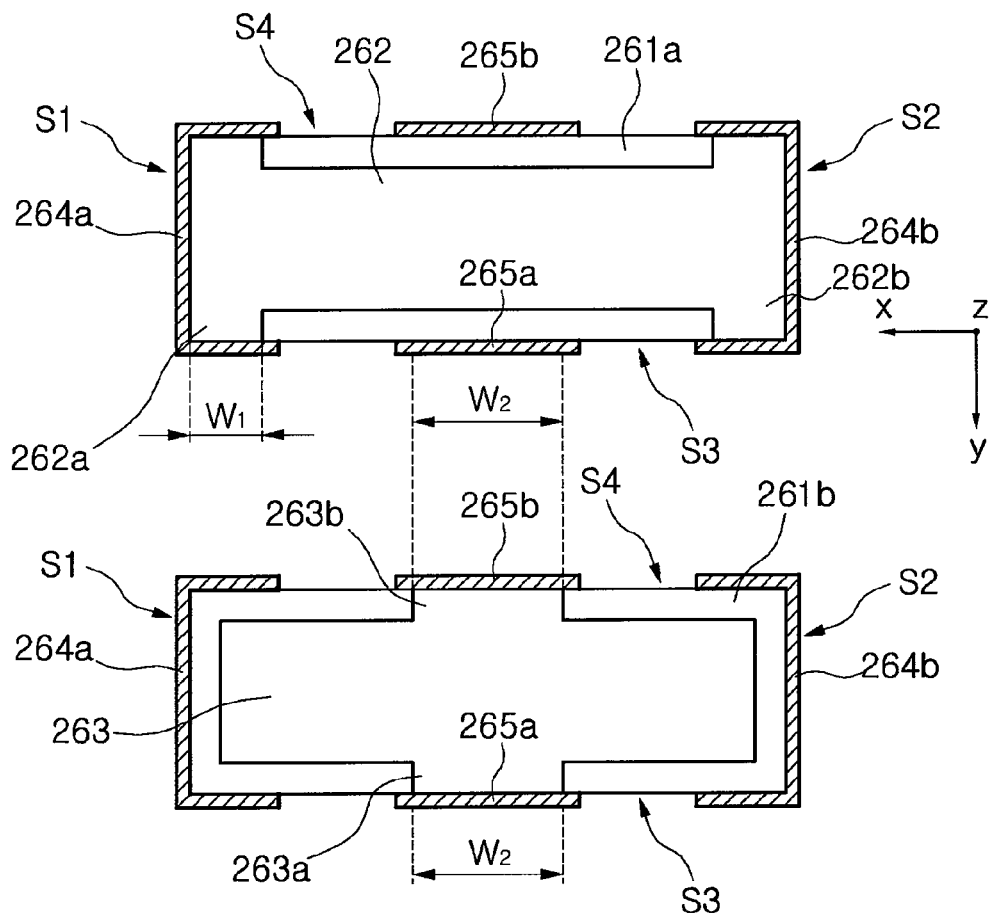
FIG. 18B is a horizontal cross-sectional view illustrating a structure of internal electrodes of the capacitor.

FIG. 18A is a perspective view illustrating an exterior of a multilayer chip capacitor according to further still another embodiment, and FIG. 18B is a horizontal cross-sectional view illustrating a structure of internal electrodes. In the embodiment shown in FIG. 18, the internal electrodes are disposed horizontally, that is, in parallel to a bottom surface (a surface mounted on a circuit board).

Referring to FIG. 18A, the multilayer chip capacitor 260 has up-down and left-right symmetries. In a capacitor body 261, first and second external electrodes 264a and 264b of a first polarity are formed on first and second side surfaces S1 and S2 facing each other, respectively. In addition, a third external electrode 265a and 265b of a second polarity is formed on third and fourth side surfaces S3 and S4 facing each other. The third external electrode 265a and 265b is formed to be two parts divided from each other. However, the third external electrode may be formed in an undivided shape of a band winding the central portion of the capacitor body 261. The first and second external electrodes 264a and 264b are formed to partially extend to the third and fourth side surfaces S3 and S4.

Referring to FIG. 18B, the structure of internal electrodes is the same as the structure of internal electrodes shown in FIGS. 6B and 6C except that the internal electrodes shown in FIG. 18 are disposed in parallel to the bottom surface. A first internal electrode 262 of a first polarity is formed to have an "H" shape. The first internal electrode 262, formed on a dielectric layer 261a is connected to the first and second external electrodes 264a and 264b through two leads 262a and 262b drawn to the side surfaces S1 and S2. A second internal electrode 263 of a second polarity is formed to have a "+" shape. The second internal electrode 263, formed on a dielectric layer 261b, is connected to the third external electrode 265a and 265b through two leads 263a and 263b drawn to the side surfaces S3 and S4.

As shown in FIG. 18B, the first lead 262a of the first internal electrode 262 is drawn to first, third, and fourth side surfaces S1, S3 and S4. The first lead 262a is in contact with the first external electrode 264a through the entire length of the lead edge exposed to the outer surfaces. The second lead 262b of the first internal electrode 263 is drawn to second, third and fourth side surfaces S2, S3, and S4. The second lead 262b is in contact with the second external electrode 264b through the entire length of the lead edge exposed to the outer surfaces. Since the first and second leads 262a and 262b are in contact with the first and second external electrodes 264a and 264b over a wide width, the contact areas between the internal and external electrodes can be maximized, and thus the paths of currents flowing through the contact areas have wide widths. In FIG. 18, the width of the portion of the first lead 262a (or the second lead 262b) drawn to the third side surface S3 is denoted by reference numeral $W_1$, and the width of the third lead 265a drawn to the third side surface S3 is denoted by reference numeral $W_1$.

Figure 19:
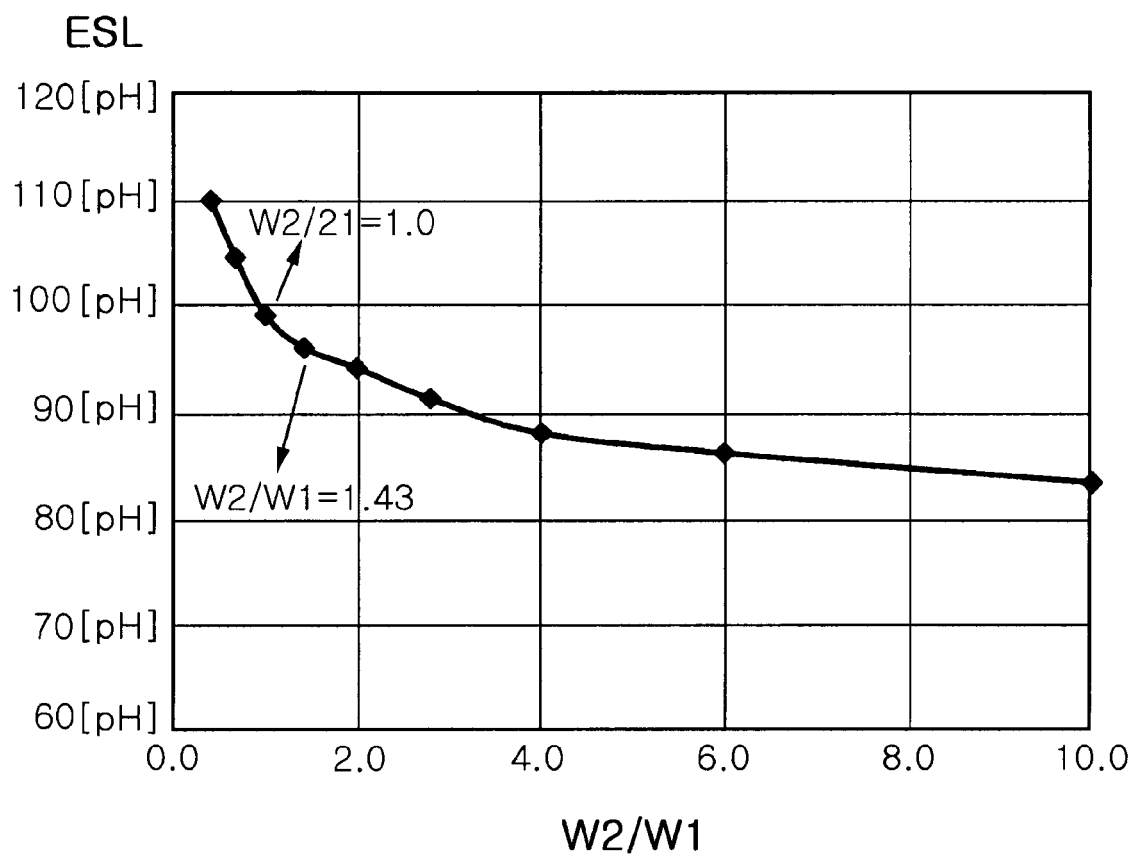
FIG. 19 is a graph illustrating a change in ESL according to a lead width ratio $W_2/W_1$ in the multilayer chip capacitor of FIG. 18A.
Figure 20:
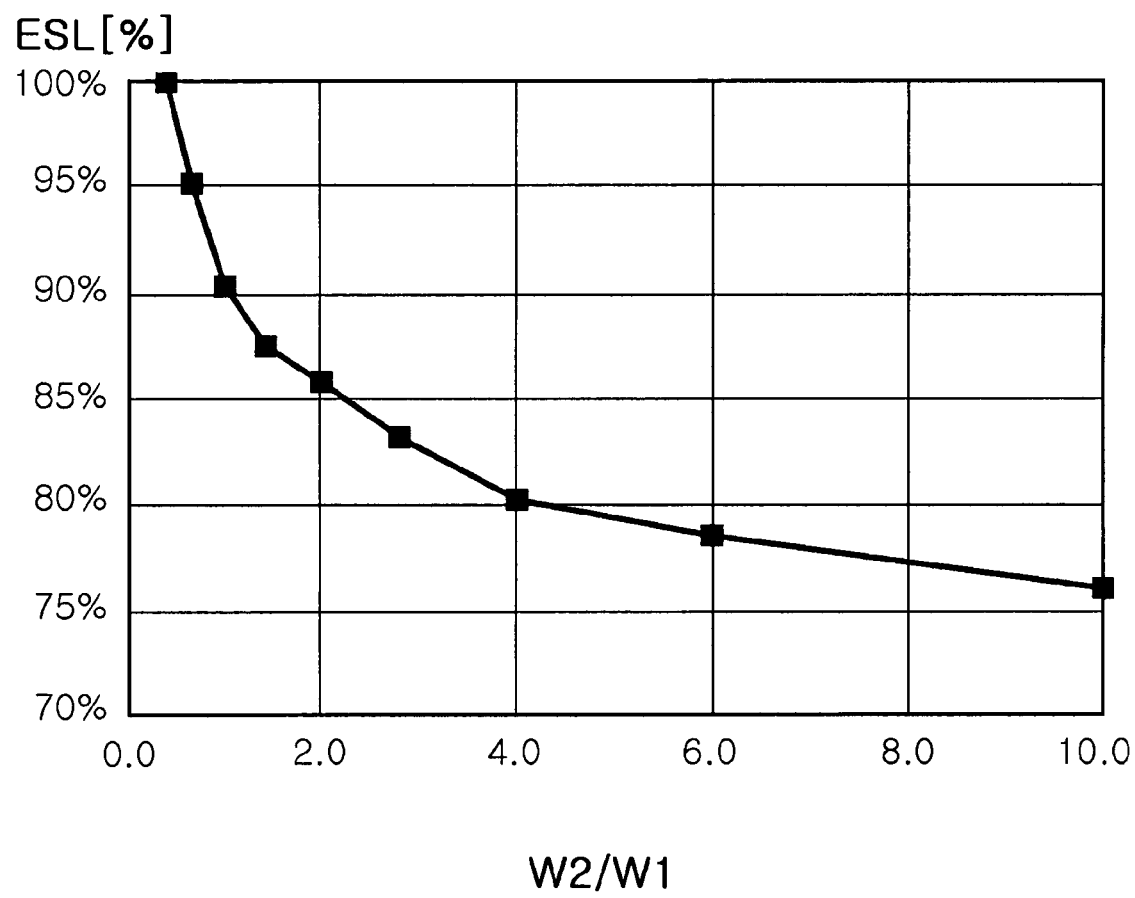
FIG. 20 is a graph illustrating a change in a relative value of ESL according to a lead width ratio $W_2/W_1$ in the multilayer chip capacitor of FIG. 18A.

FIG. 19 is a graph illustrating a change in ESL according to the lead width ratio $W_2/W_1$ in the multilayer chip capacitor 260 of FIGS. 18A-18B. FIG. 20 is a graph illustrating a change in a relative value (%) of the ESL of the graph shown in FIG. 19. As shown in FIGS. 19 and 20, as the lead width ratio $W_2/W_1$ is increased, the ESL of the multilayer chip capacitor is reduced. Particularly, it can be seen that, at the lead width ratio $W_2/W_1$ of about 1.43, the reduction rate (or slope) of ESL is greatly changed, and in case of the lead width ratio $W_2/W_1$ of 1.43 or more, the ESL has a very low value.

In the embodiment shown in FIG. 18, each polarity of the internal electrodes corresponds to one type electrode pattern, but the present invention is not limited thereto. The first-polarity internal electrodes may have two types of electrode patterns. For example, the internal electrodes disposed in parallel to the bottom surface of the multilayer chip capacitor may have the same structure as that of FIG. 17B. In this case, the first-polarity internal electrodes are classified into two types of "T"-shaped electrode patterns positioned in the opposite directions, and the two "T"-shaped electrode patterns are disposed alternately and repeatedly along the lamination direction (z-direction). The second-polarity internal electrodes having one type of "+"-shaped electrode patterns may be disposed between the two types of "T"-shaped first-polarity electrode patterns. Although the first-polarity internal electrodes have the two type of "T"-shaped electrode patterns, the multilayer chip capacitor also exhibits ESL characteristics similar to the ESL characteristics shown in FIG. 20.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
   a capacitor body formed by laminating a plurality of dielectric layers and having first and second side surface facing each other, a top surface and a bottom surface, the bottom surface being mounted on a circuit board;
   a plurality of first and second internal electrodes alternately disposed in the capacitor body with each of the dielectric layers interposed therebetween;
   a first external electrode of a first polarity formed on the first side surface to cover upper and lower edges of the first side surface and to partially extend to the top and bottom surfaces;
   a second external electrode of the first polarity formed on the second side surface to cover upper and lower edges of the second side surface and to partially extend to the top and bottom surfaces; and
   a third external electrode of a second polarity formed on the bottom surface between the first and second external electrodes,
   wherein the first and second internal electrodes are disposed in perpendicular to the bottom surface of the capacitor body,
   wherein each of the first internal electrodes has a first lead drawn to the first side surface and the bottom surface and a second lead drawn to the second side surface and the bottom surface, and each of the second internal electrodes has a third lead drawn to the bottom surface between the first and second leads,
   wherein the first lead is in contact with and fixed to the first external electrode formed on the first side surface and at least one of the top and bottom surfaces, and the second lead is in contact with and fixed to the second external electrode formed on the second side surface and at least one of the top and bottom surfaces, and
   wherein the first to third leads are in contact with the first to third external electrodes through the entire length of the edge portions of the respective leads exposed to outer surfaces of the capacitor body to be connected to the first to third external electrodes, respectively,
   wherein a lamination direction length of the capacitor body is smaller than a distance between the first side surface and the second side surface,
   wherein a width of a portion of the first lead drawn to at least one of the top and bottom surfaces of the capacitor body is equal to a width of a portion of the second lead drawn to at least one of the top and bottom surfaces of the capacitor body, and
   wherein a width ratio of a width of the third lead to the width of the portion of the first lead drawn to the at least one of the top and bottom surfaces is 1.38 or more.

2. The multilayer chip capacitor of claim 1, wherein a width of a portion of the first lead drawn to at least one of the top and bottom surfaces of the capacitor body is equal to a width of a portion of the second lead drawn to at least one of the top and bottom surfaces of the capacitor body.

3. The multilayer chip capacitor of claim 2, wherein a width of the third lead is larger than the width of the portion of the first lead drawn to the bottom surface.

4. The multilayer chip capacitor of claim 1, wherein the width ratio ranges from 1.38 to 7.

5. The multilayer chip capacitor of claim 1, further comprising a fourth external electrode of the second polarity formed on the top surface of the capacitor body between the first external electrode and second external electrode,
   wherein each of the second internal electrodes further includes a fourth lead formed between the first and second leads to be drawn to the top surface and to be connected to the fourth external electrode, and
   wherein the fourth lead is in contact with the fourth external electrode through the entire edge portion of the fourth lead exposed to the bottom surface to be connected to the fourth external electrode.

6. The multilayer chip capacitor of claim 5, wherein internal and external structures of the multilayer chip capacitor have up-down symmetry.

7. A multilayer chip capacitor comprising:
   a capacitor body formed by laminating a plurality of dielectric layers and having first and second side surface facing each other, a top surface and a bottom surface, the bottom surface being mounted on a circuit board;
   a plurality of first and second internal electrodes alternately disposed in the capacitor body with each of the dielectric layers interposed therebetween;

a first external electrode of a first polarity formed on the first side surface to cover upper and lower edges of the first side surface and to partially extend to the top and bottom surfaces;

a second external electrode of the first polarity formed on the second side surface to cover upper and lower edges of the second side surface and to partially extend to the top and bottom surfaces; and a third external electrode of a second polarity formed on the bottom surface between the first and second external electrodes, wherein the first and second internal electrodes are disposed in perpendicular to the bottom surface of the capacitor body, wherein each of the first internal electrodes has a first lead drawn to the first side surface and the bottom surface and a second lead drawn to the second side surface and the bottom surface, and each of the second internal electrodes has a third lead drawn to the bottom surface between the first and second leads, wherein the first lead is in contact with and fixed to the first external electrode formed on the first side surface and at least one of the top and bottom surfaces, and the second lead is in contact with and fixed to the second external electrode formed on the second side surface and at least one of the top and bottom surfaces, and wherein the first to third leads are in contact with the first to third external electrodes through the entire length of the edge portions of the respective leads exposed to outer surfaces of the capacitor body to be connected to the first to third external electrodes, respectively, wherein a lamination direction length of the capacitor body is larger than a distance between the first side surface and the second side surface, wherein a width of a portion of the first lead drawn to at least one of the top and bottom surfaces of the capacitor body is equal to a width of a portion of the second lead drawn to at least one of the top and bottom surfaces of the capacitor body, and wherein a width ratio of a width of the third lead to the width of the portion of the first lead drawn to the at least one of the top and bottom surfaces is 2 or more.

8. The multilayer chip capacitor of claim 7, wherein the width ratio ranges from 2 to 7.

* * * * *